(12) United States Patent
Nakamura

(10) Patent No.: US 6,987,625 B2
(45) Date of Patent: Jan. 17, 2006

(54) IMAGING LENS SYSTEM

(75) Inventor: Akira Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/876,187

(22) Filed: Jun. 24, 2004

(65) Prior Publication Data

US 2005/0002119 A1      Jan. 6, 2005

(30) Foreign Application Priority Data

Jun. 27, 2003 (JP) .............................. 2003-185047

(51) Int. Cl.
*G02B 9/12* (2006.01)
*G02B 13/18* (2006.01)

(52) U.S. Cl. ...................................... 359/791; 359/716

(58) Field of Classification Search ................ 359/716, 359/791, 760
See application file for complete search history.

(56) References Cited

U.S. PATENT DOCUMENTS 560,460 A * 5/1896 Aldis ......................... 359/791
4,165,916 A * 8/1979 Nakamura .................. 359/760

* cited by examiner

*Primary Examiner*—Georgia Epps
*Assistant Examiner*—Jack Dinh
(74) *Attorney, Agent, or Firm*—Koda & Androlia

(57) ABSTRACT

Provided is an imaging lens system comprising: a first lens in a meniscus shape having a positive power whose convex surface facing an object side; a second lens in a meniscus shape having a positive power whose concave surface facing the object side; and a third lens having a negative power whose concave surface facing the object side. The three lenses are disposed in order from the object side to the image surface side.

10 Claims, 22 Drawing Sheets

F I G. 2
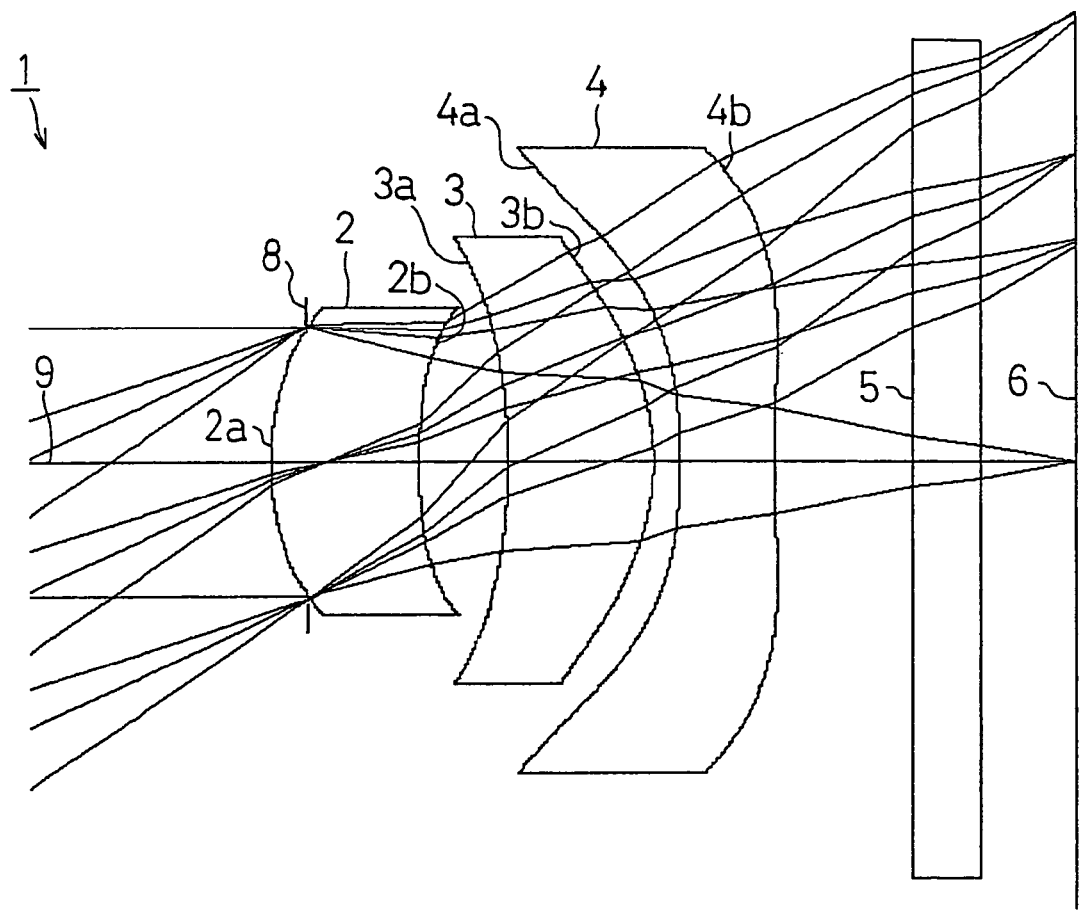

LATERAL ABERRATION

LATERAL ABERRATION

LATERAL ABERRATION

F I G. 1 7
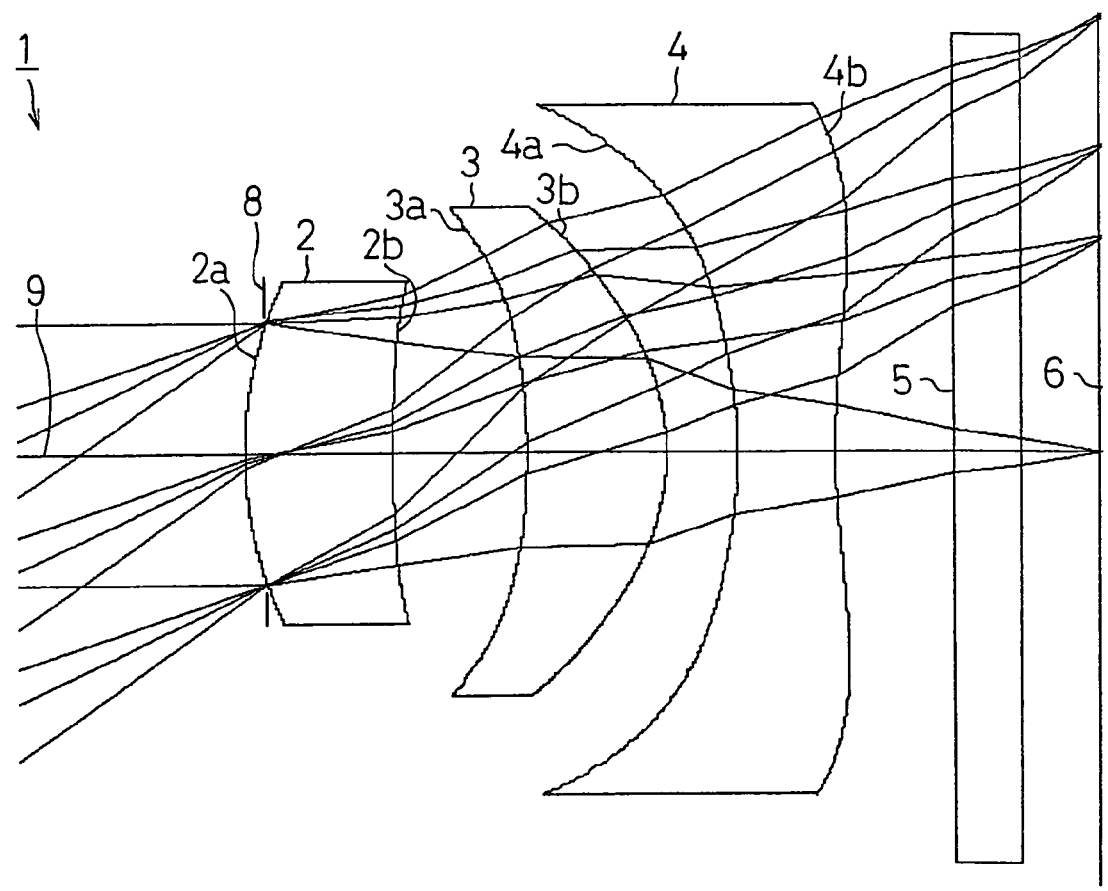

LATERAL ABERRATION

LATERAL ABERRATION

IMAGING LENS SYSTEM

BACKGROUND OF THE INVENTION

1. Field of the Invention

The present invention relates to an imaging lens system and particularly, to an imaging lens system comprising three lenses which can be preferably reduced in size and weight to be used for an image-taking device utilizing an image sensor element such as a CCD, a CMOS or the like to be mounted on a portable computer, a visual telephone, a cellular phone, a digital camera and the like.

2. Description of the Related Art

Recently, there has been a remarkable development in the multimedia industry, and there has been an increasing demand for a camera utilizing an image sensor element such as a CCD, a CMOS or the like to be mounted on a portable computer, a visual telephone, a cellular phone, a digital camera and the like. Such CCD camera needs to be mounted on a limited space. Thus, it is desirable that the camera be small in size and light in weight.

Accordingly, an imaging lens system used for such CCD camera is also necessary to be small and lightweight as well. Conventionally, the so-called one-lens system using a single lens or the two-lens system using two lenses is used as such imaging lens system.

However, although these types are extremely advantageous in terms of reducing the size and weight of the lens system, they cannot sufficiently meet the high picture quality and high resolution which are necessary for the imaging lens system in these days.

Thus, conventionally, the three-lens system using three lenses has been utilized for meeting the demands for the high picture quality and high resolution (see Japanese Unexamined Patent Publication No. 2001-75006, Japanese Unexamined Patent Publication No. 2001-83409).

Recently, especially in the field of the digital cameras and the like, there has been an increasing demand for the image-taking devices using a solid image sensor element with a higher picture quality and resolution of more than 1,000,000 pixels, which tops the conventional CIF (about 110,000 pixels) and VGA (about 300,000 pixels).

However, the conventional lens system is not yet sufficient to achieve the demands for high optical performance such as a high picture quality and high resolution through well-correcting chromatic aberration and, at the same time, to achieve further reduction of the size and weight (shortening the whole length) of the lens system itself.

In the conventional lens system, the whole length cannot be shortened so much while the back focus distance can be maintained. Thus, it is difficult to shorten the whole length of the lens system while sufficiently maintaining a high telecentricity.

The present invention has been designed to overcome the foregoing problems. An object of the present invention is to provide an imaging lens system which can achieve reduction of the size and weight while maintaining a high optical performance. Further, another object of the present invention is to provide an imaging lens system which can maintain an appropriate back focus and, at the same time, maintain the necessary telecentricity.

SUMMARY OF THE INVENTION

In order to achieve the foregoing objects, an imaging lens system according to the present invention comprises: a first lens in a meniscus shape having a positive power whose convex surface facing an object side; a second lens in a meniscus shape having a positive power whose concave surface facing the object side; and a third lens having a negative power whose concave surface facing the object side. The three lenses are disposed in order from the object side to the image surface side.

With the imaging lens system, by the combination of the first lens, the second lens and the third lens, it becomes possible to achieve reduction of the size and weight while achieving an excellent correction of various aberrations such as the chromatic aberration, distortion, curvature of field and the like.

Also, it enables to maintain the sufficient back focus with a shortened length of the entire lens system. Further, it becomes possible to reduce the angle of incident of the incoming main light ray against a sensor surface of an image-taking element so that the telecentricity can be maintained.

As described, the imaging lens system of the present invention is a small-and-light imaging lens system with an excellent optical performance, which can maintain the appropriate back focus and the appropriate telecentricity.

Further, in another aspect of the present invention, the imaging lens system comprises a diaphragm being provided on an object side of the first lens system.

With the present invention, the first lens having a positive power can be positioned in the vicinity of the diaphragm so that, further, the length of the entire lens system can be effectively shortened while maintaining the necessary angle of incident of the main light ray against the sensor surface of the image sensor element.

As described, the imaging lens system of the present invention is a small-and-light imaging lens system in which the necessary angle of incident against the sensor surface is maintained.

In still another aspect of the present invention, the imaging lens system satisfies the conditions expressed by each of the following expressions; $40<v_1<70$, $40<v_2<70$, $20<v_3<40$ (where, $v_1$: Abbe number of the first lens, $v_2$: Abbe number of the second lens, $v_3$: Abbe number of the third lens).

In the imaging lens system, the first lens and the second lens are formed using an optical material with low dispersion ($40<v<70$) and the third lens is formed using an optical material with high dispersion ($20<v<40$). Thereby, the magnification chromatic aberration can be more excellently corrected.

As described, the imaging lens system of the present invention is a small-and-light imaging lens system with an excellent optical performance in which the magnification chromatic aberration is more excellently corrected.

In a further aspect of the imaging lens system of the present invention, the surface of the third lens on the image surface side is formed in a shape which curves towards the object side from the core side to the periphery side.

With the imaging lens system, it becomes possible to control the magnification chromatic aberration so as not to be over-corrected and, at the same time, the coma aberration and the distortion can be more excellently corrected.

As described, the imaging lens system of the present invention is a small-and-light imaging lens system with a more excellent optical performance in which the magnification chromatic aberration is more appropriately corrected, and the coma aberration and the distortion are more excellently corrected.

In a still further aspect of the imaging lens system of the present invention, the third lens is formed to have a smaller negative power on the periphery side than the negative power on the core side.

With the imaging lens system, it is possible to more appropriately correct the magnification chromatic aberration, the coma aberration and the distortion.

As described, the imaging lens system of the present invention is a small-and-light imaging lens system with a more excellent optical performance in which the magnification chromatic aberration, the coma aberration and the distortion are more appropriately corrected.

In a yet further aspect of the imaging lens system of the present invention, in each of the first lens, the second lens and the third lens, at least either one of the surfaces on the object side or the image surface side is formed in an aspherical shape.

With the imaging lens system, it is possible to further reduce the size and weight of the system while achieving more excellent correction of the various aberrations.

As described, the imaging lens system of the present invention is a small-and-light imaging lens system with a more excellent optical performance in which various aberrations are more excellently corrected.

In a yet further aspect of the imaging lens system of the present invention, a condition expressed by an expression $0.25<r_1/f<0.55$ (where, $r_1$: radius of center curvature of a surface of the first lens on the object side, f: focal length of entire lens system) is to be satisfied.

In the imaging lens system, the value of the ratio $(r_1/f)$ between the radius of center curvature $r_1$ of the surface of the first lens on the object side and the focal length f of the entire lens system is set to satisfy $0.25<r_1/f<0.55$. Thereby, it enables to shorten the length of the entire imaging lens system more effectively while maintaining the necessary optical performance.

As described, the imaging lens system of the present invention is suitable for reducing the size and weight while maintaining the necessary optical performance.

In a yet further aspect of the imaging lens system of the present invention, conditions expressed by the expressions $1.5<r_2/r_1<3.0$, $0.15<d_1/f<0.35$ (where, $r_2$: radius of center curvature of a surface of the first lens on the image surface side, $d_1$: thickness in the center of the first lens) are to be satisfied.

In the imaging lens system, the value of the ratio $(r_2/r_1)$ between the radius of center curvature $r_2$ of the surface of the first lens on the image surface side and the radius of center curvature $r_1$ of the surface of the first lens on the object side is set to satisfy $1.5<r_2/r_1<3.0$. Further, the value of the ratio $(d_1/f)$ between the center thickness $d_1$ in of the first lens and the focal length f of the entire lens system is set to satisfy $0.15<d_1/f<0.35$. Thereby, it enables to shorten the length of the entire imaging lens system more effectively by sufficiently obtaining the power of the first lens, while more effectively maintaining the back focus and more excellently correcting the curvature of field.

As described, the imaging lens system of the present invention becomes further reduced in size and weight in which the back focus is more effectively maintained and the curvature of field is more excellently corrected.

In a yet further aspect of the imaging lens system of the present invention, a condition expressed by an expression $-1.5<r_3/f<-0.3$ (where, $r_3$: radius of center curvature of a surface of the second lens on the object side) is to be satisfied.

In the imaging lens system, the value of the ratio $(r_3/f)$ between the radius of center curvature $r_3$ of the surface of the second lens on the object side and the focal length f of the entire lens system is set to satisfy $-1.5<r_3/f<-0.3$. Thereby, it enables to more effectively maintain the back focus and to correct the various aberrations such as the curvature of field, the coma aberration and the like in a more well-balanced manner.

As described, the imaging lens system of the present invention is a small-and-light imaging lens system with a more excellent optical performance in which the back focus is more effectively maintained.

BRIEF DESCRIPTION OF THE DRAWINGS

FIG. 2 is a schematic illustration showing FIRST EXAMPLE of an imaging lens system according to the present invention;

FIG. 17 is a schematic illustration showing SIXTH EXAMPLE of an imaging lens system according to the present invention;

DETAILED DESCRIPTION OF THE INVENTION

An embodiment of the imaging lens system according to the present invention will be described by referring to FIG. 1.

Figure 1:
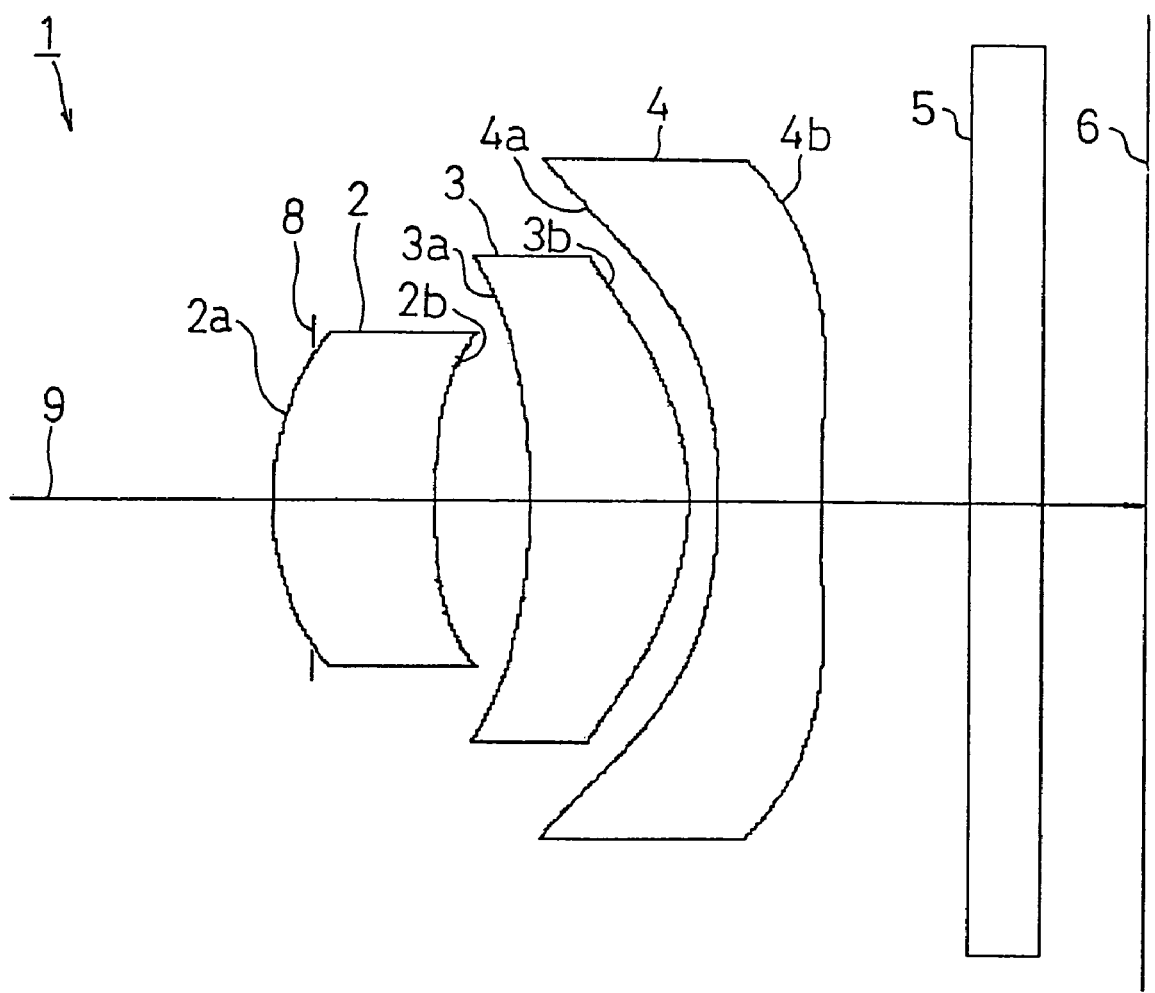
FIG. 1 is a schematic illustration showing an embodiment of an imaging lens system according to the present invention.

As shown in FIG. 1, an imaging lens system 1 of the embodiment comprises, in order from an object side to an imaging surface side, a first lens 2 in a meniscus shape having a positive power whose convex surface facing an object side, a second lens 3 in a meniscus shape having a positive power whose concave surface facing the object side, and a third lens 4 having a negative power whose concave surface facing the object side. A lens face 2a of the first lens 2 on the object side, a lens face 3a of the second lens 3 on the object side, and a lens face 4a of the third lens 4 on the object side are referred to as first faces 2a, 3a, and 4a, respectively, while lens faces 2b, 3b, and 4b on the imaging surface side are referred to as second faces 2b, 3b, and 4b of the respective lenses.

On the second face 4b side of the third lens 4, various filters 5 such as a cover glass, an IR cut filter and a lowpass filter, and an image-taking surface 6 as a light-receiving surface of an image sensor element such as a CCD or a CMOS are provided, respectively. The various filters 5 may be omitted as appropriate.

In the embodiment, by providing the first lens 2, the second lens 3, and the third lens 4 formed as described above, it becomes possible to reduce the size and the weight of the imaging lens system by shortening the length of the entire lens system, while excellently correcting the various aberrations such as the curvature of field, the coma aberration and the like.

Also, while shortening the whole length of the lens system, the necessary back focus can be sufficiently maintained. As a result, it becomes possible to provide a space sufficient for inserting the optical systems such as the various filters 5.

Further, it enables to maintain the telecentricity by reducing the angle of incident of the main light ray against the sensor surface of the image sensor element.

Further, in the embodiment, the second face 2b of the first lens 2 is a concave surface so that the light ray passing through the second face 2b is suppressed to be in a lower height than light ray passing through the first face 2a. By forming the second face 2b of the first lens into a concave surface, the back focus can be kept larger and, at the same time, the curvature of field can be more excellently corrected by further reducing the Petzval sum.

The second face 2b of the first lens 2 may be formed in an aspherical surface in which the radius of center curvature becomes gradually smaller from the optical axis 9 side towards the periphery side. Thereby, the coma aberration can be more excellently corrected.

Also, the second face 3b of the second lens 3 may be formed in an aspherical surface in which the radius of center curvature becomes gradually larger from the optical axis 9 side towards the periphery side. Thereby, decrease of the curvature of field can be more effectively prevented.

In addition to the above-described configuration, in the embodiment, a diaphragm 8 is provided on the object side of the first lens 2.

Thereby, the second lens face 2a of the first lens 2 having a positive power can be positioned in the vicinity of the diaphragm 8. Thus, the length of the entire lens system can be more effectively shortened while maintaining the necessary angle of incident of the main light ray against the sensor surface of the image sensor element.

In the embodiment, further, the conditions expressed by each of the following expressions are to be satisfied:

$$40 < v_1 < 70 \tag{1}$$

$$40 < v_2 < 70 \tag{2}$$

$$20 < v_3 < 40 \tag{3}$$

where, $v_1$ denotes Abbe number of the first lens, $v_2$ denotes Abbe number of the second lens, and $v_3$ denotes Abbe number of the third lens.

As described, by forming the first lens 2 and the second lens 3 using an optical material with low dispersion (v is large) and forming the third lens 4 using an optical material with high dispersion (v is small), the magnification chromatic aberration can be more excellently corrected.

Further, in the embodiment, the second face 4b of the third lens 4 is formed in a shape which curves towards the object side from the core side to the periphery side.

Specifically, in FIG. 1, for example, the second face 4b of the third lens 4 as a concave surface with the center facing the image surface side is formed in an aspherical surface which largely curves towards the object side from the optical axis 9 towards the periphery side.

Thereby, it becomes possible to control the magnification chromatic aberration so as not be over-corrected while enabling to more excellently correct the coma aberration and the distortion.

Further, in the embodiment, the third lens 4 is so formed that the negative power on the periphery side is smaller than that on the core side.

As a specific example, the third lens 4 is formed in so formed that the negative power gradually becomes small from the optical axis 9 towards the periphery side.

Thereby, the magnification chromatic aberration, the coma aberration, and the distortion can be more appropriately corrected.

Further, in the embodiment, in each of the first lens 2, the second lens 3 and the third lens 4, at least either the first faces 2a, 3a, 4a or the second faces 2b, 3b, 4b is formed in an aspherical shape.

Thereby, it enables to further reduce the size and weight of the system while more excellently correcting the various aberrations.

Further, in the embodiment, the condition expressed by a following expression (4) is to be satisfied:

$$0.25 < r_1/f < 0.55 \tag{4}$$

where, $r_1$ denotes the radius of center curvature of the first face 2a of the first lens 2 and f denotes the focal length of the entire lens system.

When the value of $r_1/f$ is less than the value (0.25) shown in the expression (4), although it is effective for shortening the lens system, the chromatic aberration such as color flare is increased in the periphery of the lens face. In addition, the angle of incident of the incoming light ray against the lens face 2a becomes large, thereby decreasing the light permeability of the lens 2.

On the other hand, when the value of $r_1/f$ is over the value (0.55) shown in the expression (4), the length of the entire lens system cannot be effectively shortened.

Accordingly, in the embodiment, by setting the value of $r_1/f$ to satisfy the expression (4), it becomes possible to more effectively shorten the length of the entire system while maintaining the necessary optical performance without decreasing the light permeability of the lens 2 and increasing the chromatic aberration.

Further, in the embodiment, the conditions expressed by the following expressions (5) and (6) are to be satisfied:

$$1.5 < r_2/r_1 < 3.0 \quad (5)$$

$$0.15 < d_1/f < 0.35 \quad (6)$$

where, $r_2$ in the expression (5) denotes the radius of center curvature of the second face 2b of the first lens 2 and $d_1$ in the expression (6) denotes the thickness in the center of the first lens 2.

When the value of $r_2/r_1$ is less than the value (1.5) shown in the expression (5), it becomes difficult to obtain a sufficient power of the lens 2 so that it is hard to shorten the length of the entire lens system.

On the other hand, when the value of $r_2/r_1$ is over the value (3.0) shown in the expression (5), it becomes impossible to sufficiently maintain the back focus and correct the curvature of field.

Further, when the value of $d_1/f$ is less than the value (0.15) shown in the expression (6), the power of the first lens 2 becomes insufficient so that it becomes difficult to shorten the length of the entire lens system.

On the other hand, when the value of $d_1/f$ is over the value (0.35) shown in the expression (6), the thickness of the first lens 2 becomes too thick so that it also becomes difficult to shorten the length of the entire lens system.

Accordingly, in the embodiment, by setting the value of $r_2/r_1$ to satisfy the expression (5) and setting the value of $d_1/f$ to satisfy the expression (6), it enables to obtain a sufficient power of the first lens 2 and more effectively shorten the length of the entire lens system while more effectively maintaining the back focus and more excellently correcting the curvature of field.

More preferably, it is desirable to set the value of $r_2/r_1$ to satisfy $1.7 < r_2/r_1 < 3.0$. Thereby, it becomes possible to obtain a desired optical performance even when using a material with a relatively small refraction index. For example, it is possible to obtain a desired performance even in the case where the all of the lenses are formed by plastics.

Further, in the embodiment, the condition expressed by a following expression (7) is to be satisfied:

$$-1.5 < r_3/f < -0.3 \quad (7)$$

where, $r_3$ in the expression (7) denotes the radius of the first face 3a of the second lens 3.

When the value of $r_3/f$ is over the value (−0.3) shown in the expression (7), the various aberrations such as the coma aberration and the like are deteriorated.

When the value of $r_3/f$ is less than the value (−1.5) shown in the expression (7), it becomes impossible to appropriately maintain the back focus and correct the curvature of field.

Accordingly, in the embodiment, by setting the value of $r_3/f$ to satisfy the expression (7), the back focus can be more effectively maintained. Also, it becomes possible to correct the various aberrations such as the curvature of field, the coma aberration and the like in a well-balanced manner.

EXAMPLES

Next, EXAMPLES of the present invention will be described by referring to FIG. 2 to FIG. 19.

In EXAMPLES, F NO denotes F number, ω denotes a half angle of view, and r denotes the radius of center curvature. Further, d denotes the distance to the next optical surface, nd denotes the index of refraction against the d line (yellow) and vd denotes the Abbe number (d line being the reference).

k, A, B, C and D denote each coefficient in a following expression (8). In other words, the shape of the aspherical surface is expressed by the following expression provided that the optical axial direction is taken as the Z axis, the direction orthogonal to the optical axis is the X axis, the forwarding direction of light is positive, k is the constant of cone, A, B, C, D are the aspherical coefficients, and r is the radius of center curvature:

$$Z(X) = r^{-1}X^2/[1+\{1-(k+1)r^{-2}X^2\}^{1/2}] + AX^4 + BX^6 + CX^8 + DX^{10} \quad (8)$$

First Example

FIG. 2 shows FIRST EXAMPLE of the present invention. In FIRST EXAMPLE, a diaphragm 8 was disposed on the first face 2a side of the first lens 2 in the same manner as the one shown in FIG. 1. In FIRST EXAMPLE, the diaphragm 8 was regarded as the same surface as the first face 2a of the first lens 2. Each lens was formed using plastics.

An imaging lens system 1 of FIRST EXAMPLE was set under the following condition.

f=5.14 mm, F NO=2.80, ω=30.8°

| Face Number | r | d | nd | vd |
|---|---|---|---|---|
| (Object Point) | ∞ | | | |
| 1(First Face of First Lens)(Diaphragm) | 1.633 | 1.10 | 1.525 | 56 |
| 2(Second Face of First Lens) | 3.179 | 0.66 | | |
| 3(First Face of Second Lens) | −4.200 | 1.10 | 1.525 | 56 |
| 4(Second Face of Second Lens) | −1.537 | 0.20 | | |
| 5(First Face of Third Lens) | −4.059 | 0.70 | 1.585 | 30 |
| 6(Second Face of Third Lens) | 5.947 | 1.00 | | |
| 7(First Face of Cover Glass) | 0.0 | 0.50 | 1.517 | 64 |
| 8(Second Face of Cover Glass) | 0.0 | | | |
| (Image Surface) | | | | |

| Face No. | k | A | B | C | D |
|---|---|---|---|---|---|
| 1 | −2.5097 | 0.72970845e−01 | 0.76260110e−02 | 0.00000000e+00 | 0.00000000e+00 |
| 2 | 0.9109 | 0.58065758e−01 | −0.15618288e−01 | 0.47226690e−01 | 0.00000000e+00 |
| 3 | 0.0000 | −0.22531811e−01 | 0.00000000e+00 | 0.00000000e+00 | 0.00000000e+00 |
| 4 | −0.8920 | −0.13135149e−01 | 0.11132169e−01 | 0.00000000e+00 | 0.00000000e+00 |
| 5 | 0.0000 | −0.85129015e−01 | 0.12008824e−01 | 0.00000000e+00 | 0.00000000e+00 |
| 6 | 0.0000 | −0.73321707e−01 | 0.11080802e−01 | −0.12612973e−02 | 0.46066465e−04 |

Under such conditions, $v_1=56$, $v_2=56$, $v_3=30$ were achieved, thereby satisfying the conditions expressed by each of the expressions (1) to (3). Also, $r_1/f=0.32$ was achieved, thereby satisfying the condition expressed by the expression (4). Further, $r_2/r_1=1.95$, $d_1/f=0.21$ were achieved, thereby satisfying the conditions expressed by the expressions (5) and (6). Further, $r_3/f=-0.82$ was achieved, thereby satisfying the condition expressed by the expression (7).

Figure 3:
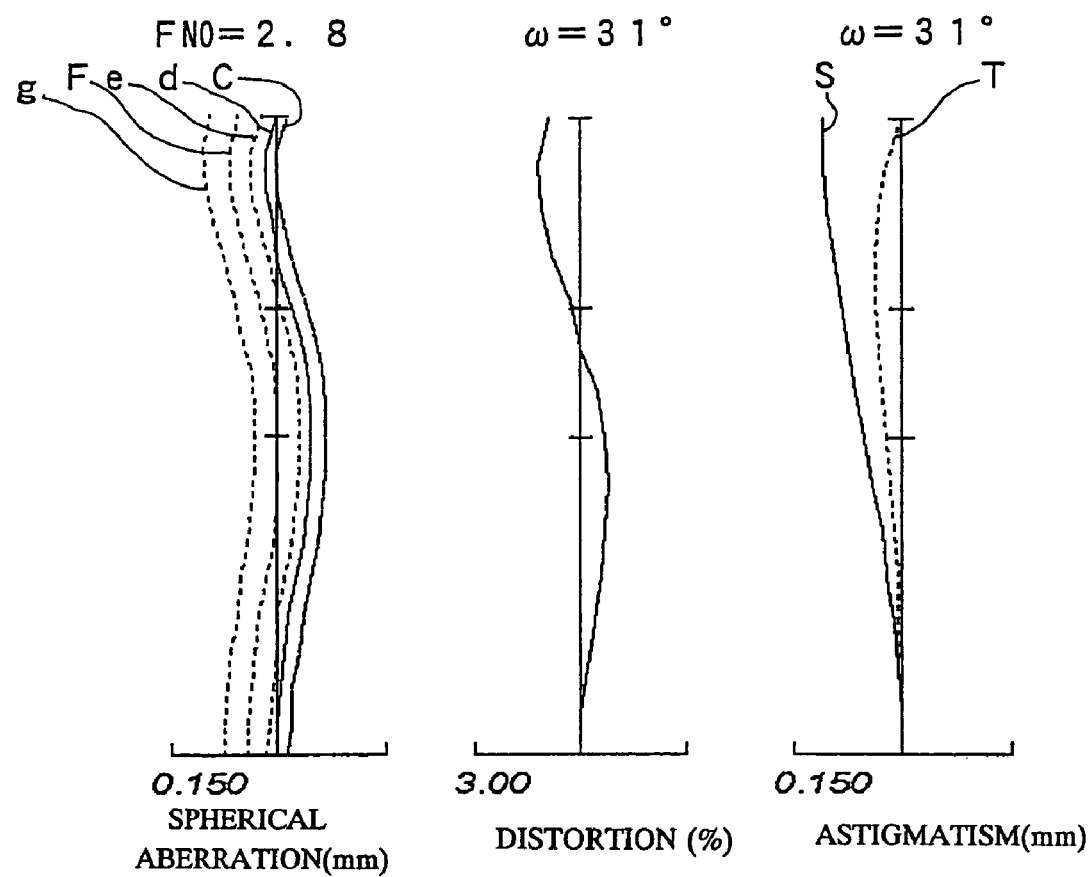
FIG. 3 is an explanatory illustration showing spherical aberration, distortion and astigmatism of the imaging lens system shown in FIG. 2.
Figure 4:
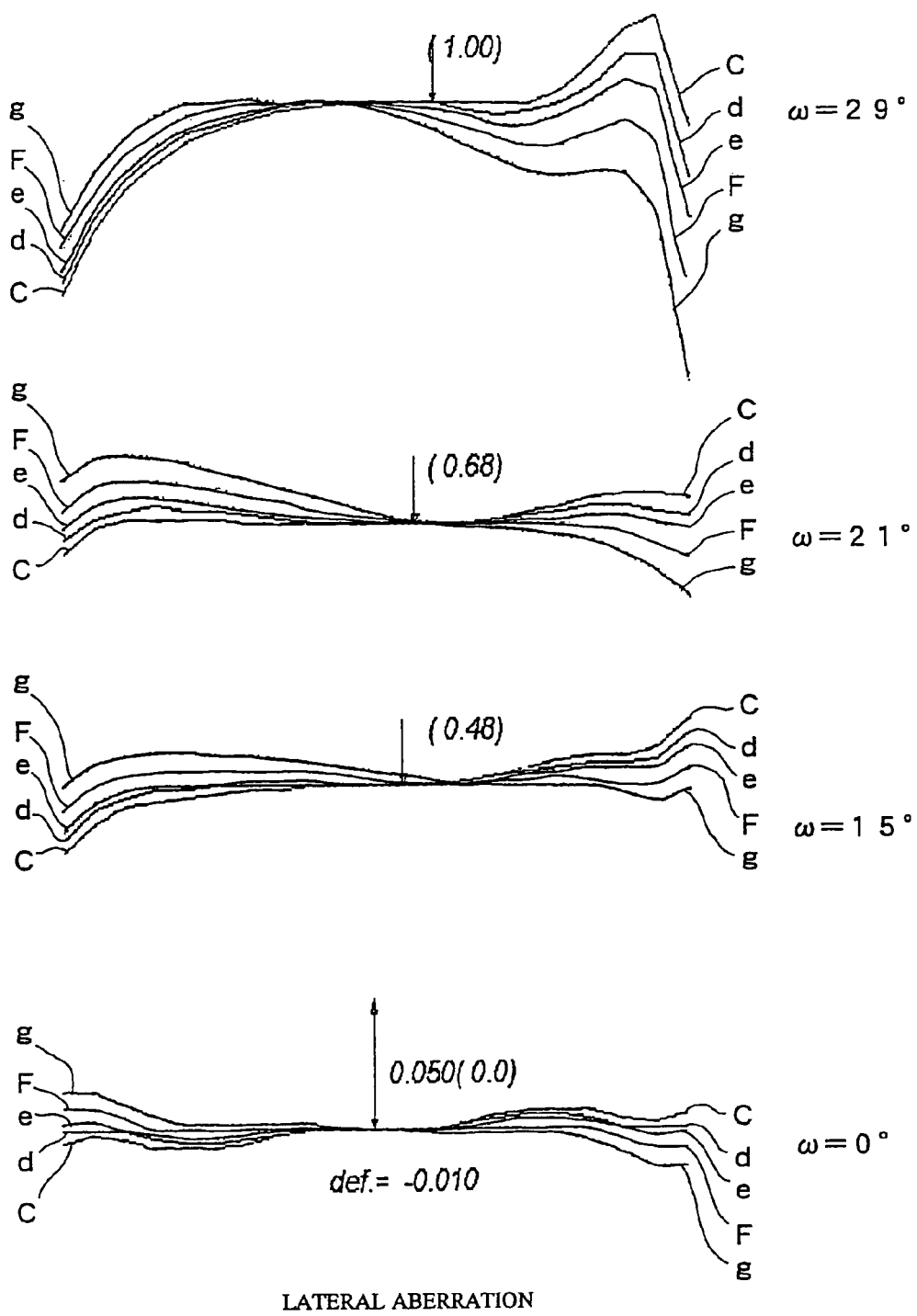
FIG. 4 is an explanatory illustration showing lateral aberration of the imaging lens system shown in FIG. 2.

FIG. 3 shows the spherical aberration, the distortion and the astigmatism of the imaging lens system 1 of FIRST EXAMPLE and FIG. 4 shows the lateral aberration.

The spherical aberration, the distortion, the astigmatism and the lateral aberration were all satisfied. According to the results, it can be seen that a sufficient optical property obtained.

The whole length of the imaging lens system 1 at this time was 5.9530 mm, which sufficiently met the demands for reducing the size and weight.

Also, the angle of incident against the sensor surface of the image sensor element can be controlled below 29.4°.

Second Example

Figure 5:
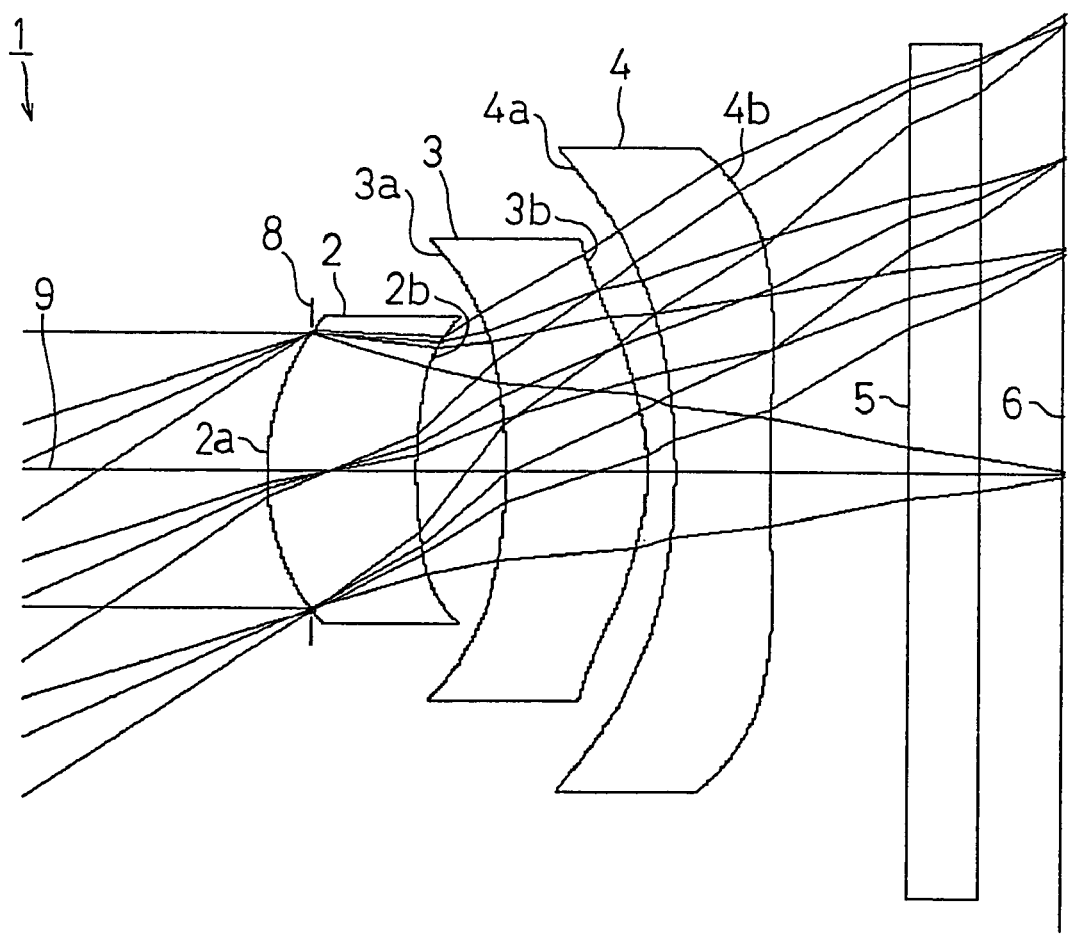
FIG. 5 is a schematic illustration showing SECOND EXAMPLE of an imaging lens system according to the present invention.

FIG. 5 shows SECOND EXAMPLE of the present invention. In SECOND EXAMPLE, the diaphragm 8 was disposed on the first face 2a side of the first lens 2 in the same manner as the one shown in FIG. 1. In SECOND EXAMPLE, the diaphragm 8 was regarded as the same surface as the first face 2a of the first lens 2. Each lens was formed using plastics.

The imaging lens system 1 of SECOND EXAMPLE was set under the following condition.

f=5.14 mm, F NO=2.80, ω=30.8°

| Face Number | r | d | nd | vd |
|---|---|---|---|---|
| (Object Point) | ∞ | | | |
| 1(First Face of First Lens)(Diaphragm) | 1.508 | 1.07 | 1.525 | 56 |
| 2(Second Face of First Lens) | 2.893 | 0.67 | | |
| 3(First Face of Second Lens) | −3.569 | 1.05 | 1.525 | 56 |
| 4(Second Face of Second Lens) | −1.660 | 0.20 | | |
| 5(First Face of Third Lens) | −4.090 | 0.70 | 1.585 | 30 |
| 6(Second Face of Third Lens) | 8.372 | 1.00 | | |
| 7(First Face of Cover Glass) | 0.0 | 0.50 | 1.517 | 64 |

-continued

| Face Number | r | d | nd | vd |
|---|---|---|---|---|
| 8(Second Face of Cover Glass) (Image Surface) | 0.0 | | | |

| Face No. | k | A | B | C | D |
|---|---|---|---|---|---|
| 1 | −2.1462 | 0.73620846e−01 | 0.18628327e−01 | 0.00000000e+00 | 0.00000000e+00 |
| 2 | −0.0551 | 0.50785078e−01 | −0.64743745e−02 | 0.81375425e−01 | 0.00000000e+00 |
| 3 | 0.0000 | −0.41673942e−01 | 0.00000000e+00 | 0.00000000e+00 | 0.00000000e+00 |
| 4 | −1.4748 | 0.25706647e−02 | 0.10262213e−01 | 0.00000000e+00 | 0.00000000e+00 |
| 5 | 0.0000 | −0.21213273e−01 | 0.17673811e−02 | 0.00000000e+00 | 0.00000000e+00 |
| 6 | 0.0000 | −0.47189863e−01 | 0.54889783e−02 | −0.98844356e−03 | 0.41160933e−04 |

Under such conditions, $v_1=56$, $v_2=56$, $v_3=30$ were achieved, thereby satisfying the conditions expressed by each of the expressions (1) to (3). Also, $r_1/f=0.29$ was achieved, thereby satisfying the condition expressed by the expression (4). Further, $r_2/r_1=1.92$, $d_1/f=0.21$ were achieved, thereby satisfying the conditions expressed by the expressions (5) and (6). Further, $r_3/f=-0.69$ was achieved, thereby satisfying the condition expressed by the expression (7).

Figure 6:
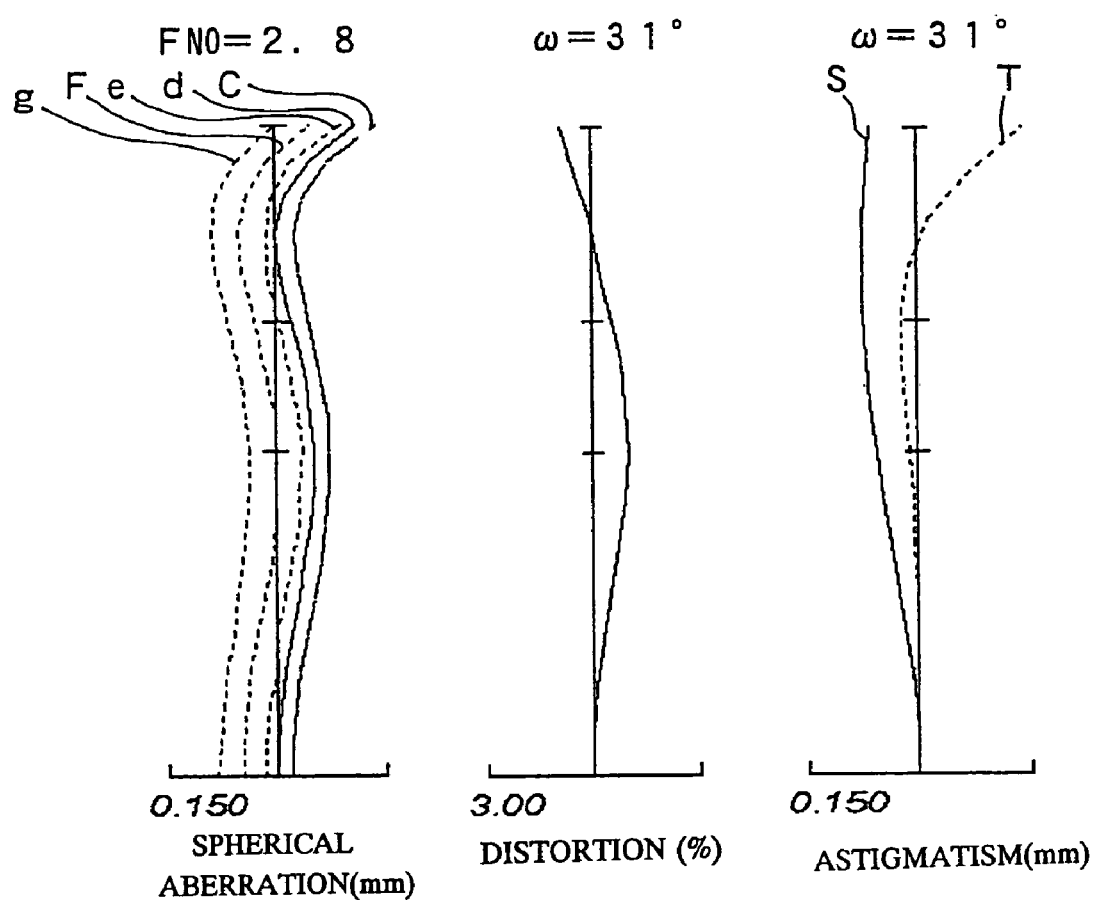
FIG. 6 is an explanatory illustration showing spherical aberration, distortion and astigmatism of the imaging lens system shown in FIG. 5.
Figure 7:
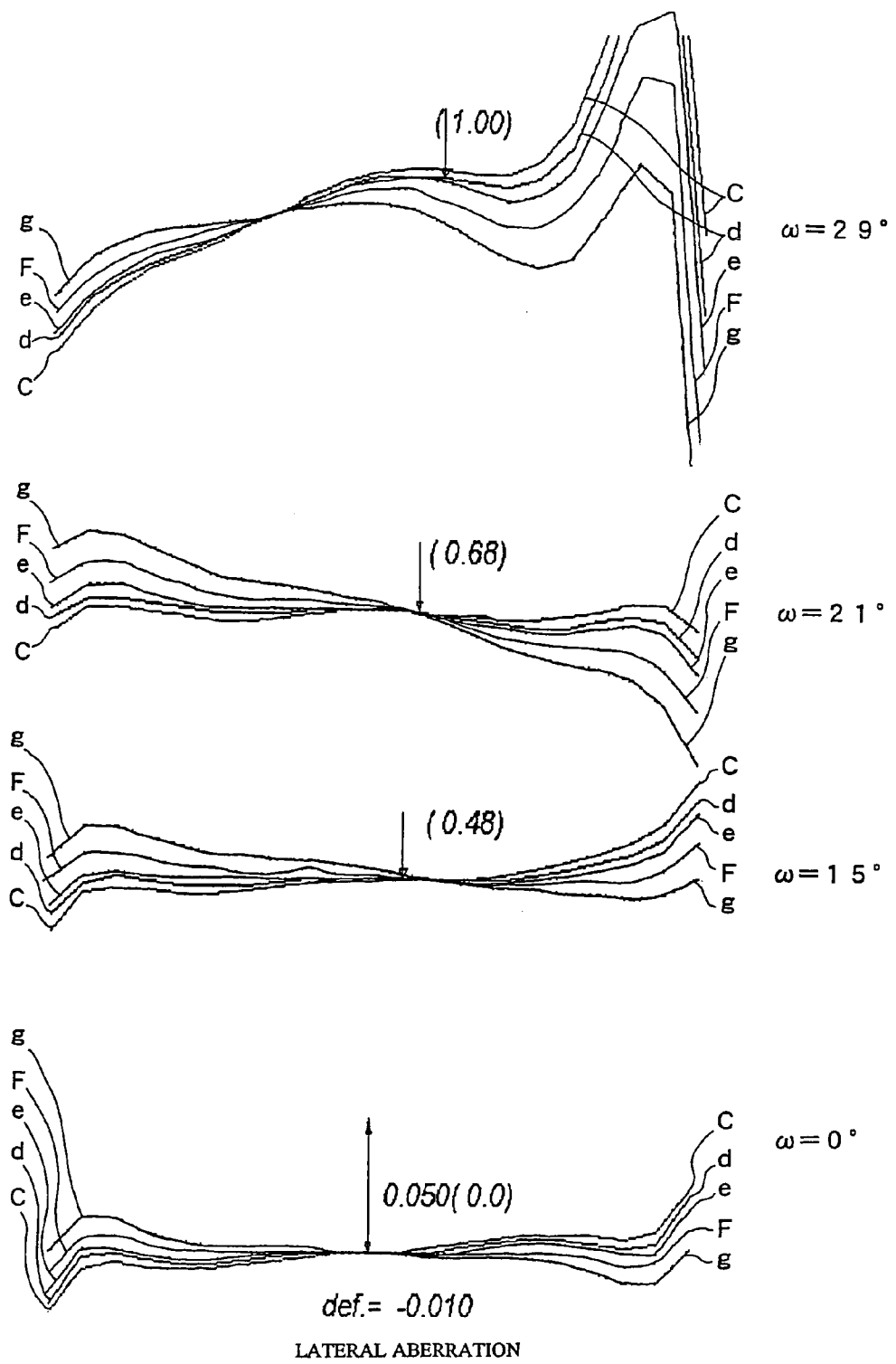
FIG. 7 is an explanatory illustration showing lateral aberration of the imaging lens system shown in FIG. 5.

FIG. 6 shows the spherical aberration, the distortion and the astigmatism of the imaging lens system 1 of SECOND EXAMPLE and FIG. 7 shows the lateral aberration.

The spherical aberration, the distortion, the astigmatism and the lateral aberration were all satisfied. According to the results, it can be seen that a sufficient optical property can be obtained.

The whole length of the imaging lens system 1 at this time was 5.7939 mm, which sufficiently met the demands for reducing the size and weight.

Also, the angle of incident against the sensor surface of the image sensor element can be controlled below 29.1°.

Third Example

Figure 8:
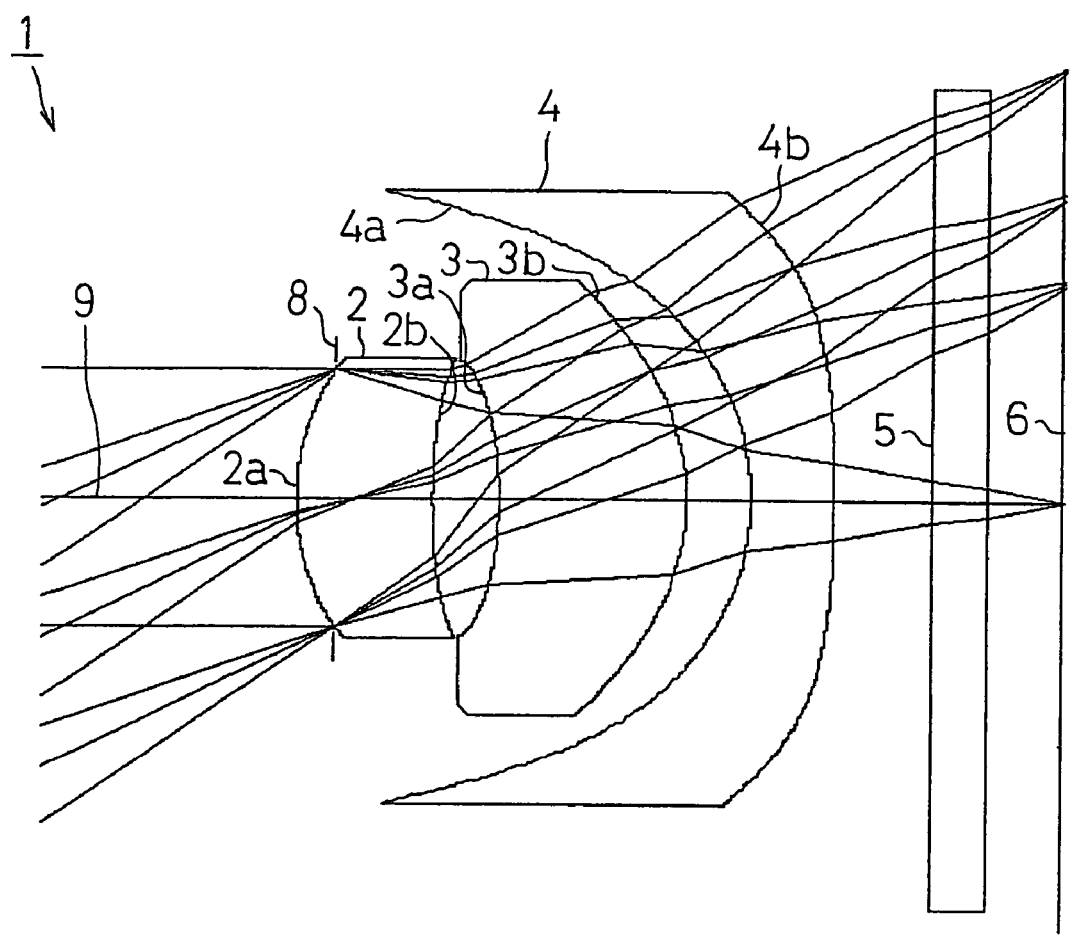
FIG. 8 is a schematic illustration showing THIRD EXAMPLE of an imaging lens system according to the present invention.

FIG. 8 shows THIRD EXAMPLE of the present invention. In THIRD EXAMPLE, the diaphragm 8 was disposed on the first face 2a side of the first lens 2 in the same manner as the one shown in FIG. 1. In THIRD EXAMPLE, the diaphragm 8 was also regarded as the same surface as the first face 2a of the first lens 2. Each lens was formed using plastics.

The imaging lens system 1 of THIRD EXAMPLE was set under the following condition.

f=6.12 mm, F NO=2.80, ω=31.0°

| Face Number | r | d | nd | vd |
|---|---|---|---|---|
| (Object Point) | ∞ | | | |
| 1(First Face of First Lens)(Diaphragm) | 1.898 | 1.25 | 1.525 | 56 |

-continued

| Face Number | r | d | nd | vd |
|---|---|---|---|---|
| 2(Second Face of First Lens) | 4.753 | 0.63 | | |
| 3(First Face of Second Lens) | −3.544 | 1.77 | 1.525 | 56 |
| 4(Second Face of Second Lens) | −1.666 | 0.59 | | |
| 5(First face of Third Lens) | −1.932 | 0.76 | 1.585 | 28 |
| 6(Second Face of Third Lens) | −12.540 | 0.90 | | |
| 7(First Face of Cover Glass) | 0.0 | 0.50 | 1.517 | 64 |
| 8(Second Face of Cover Glass) (Image Surface) | 0.0 | | | |

| Face No. | k | A | B | C | D |
|---|---|---|---|---|---|
| 1 | −0.9857 | 0.20144310e−01 | 0.90746559e−02 | 0.00000000e+00 | 0.00000000e+00 |
| 2 | 6.7169 | 0.97180732e−02 | 0.82112836e−02 | 0.00000000e+00 | 0.00000000e+00 |
| 3 | 8.0272 | −0.17627963e−01 | 0.62161439e−02 | 0.00000000e+00 | 0.00000000e+00 |
| 4 | −2.2960 | −0.31257050e−01 | 0.23536937e−02 | 0.00000000e+00 | 0.00000000e+00 |
| 5 | −0.6326 | −0.17943021e−02 | −0.39646608e−02 | 0.00000000e+00 | 0.00000000e+00 |
| 6 | 0.0000 | −0.15153272e−01 | −0.18413849e−03 | 0.00000000e+00 | 0.00000000e+00 |

Under such conditions, $v_1=56$, $v_2=56$, $v_3=28$ were achieved, thereby satisfying the conditions expressed by each of the expressions (1) to (3). Also, $r_1/f=0.31$ was achieved, thereby satisfying the condition expressed by the expression (4). Further, $r_2/r_1=2.50$, $d_1/f=0.20$ were achieved, thereby satisfying the conditions expressed by the expressions (5) and (6). Further, $r_3/f=-0.58$ was achieved, thereby satisfying the condition expressed by the expression (7).

Figure 9:
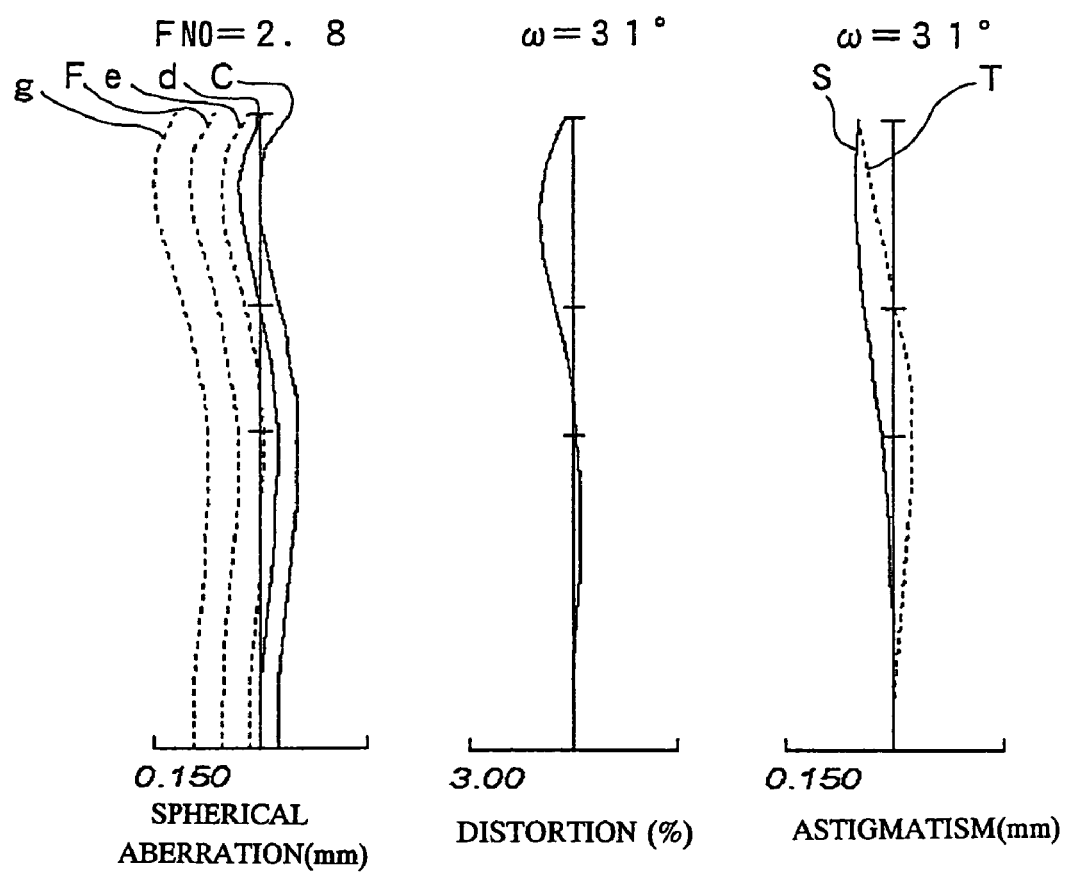
FIG. 9 is an explanatory illustration showing spherical aberration, distortion and astigmatism of the imaging lens system shown in FIG. 8.
Figure 10:
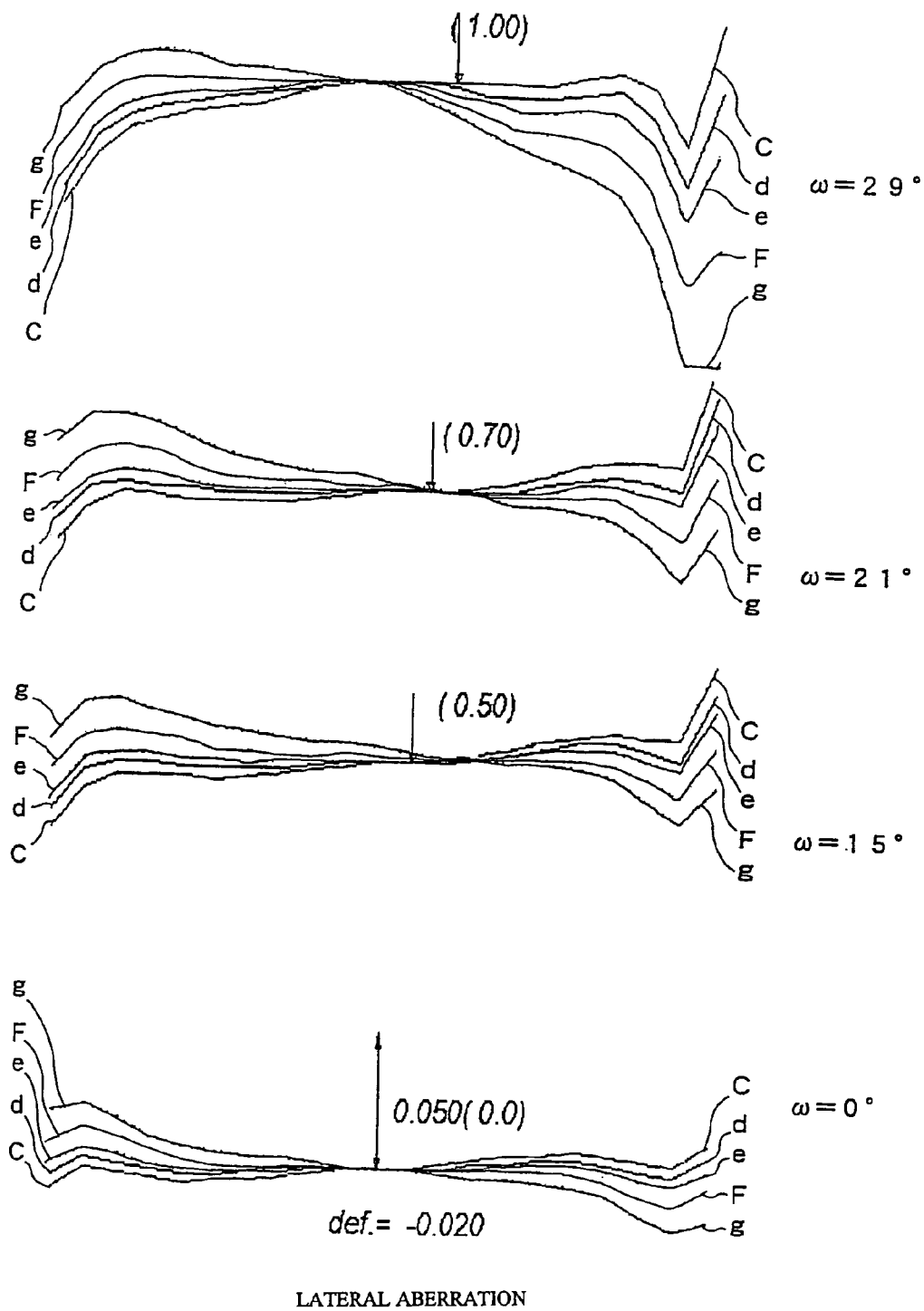
FIG. 10 is an explanatory illustration showing lateral aberration of the imaging lens system shown in FIG. 8.

FIG. 9 shows the spherical aberration, the distortion and the astigmatism of the imaging lens system 1 of THIRD EXAMPLE and FIG. 10 shows the lateral aberration.

The spherical aberration, the distortion, the astigmatism and the lateral aberration were all satisfied. According to the results, it can be seen that a sufficient optical property can be obtained.

The whole length of the imaging lens system 1 at this time was 7.0990 mm, which sufficiently met the demands for reducing the size and weight.

Also, the angle of incident against the sensor surface of the image sensor element can be controlled below 29.0°.

Fourth Example

Figure 11:
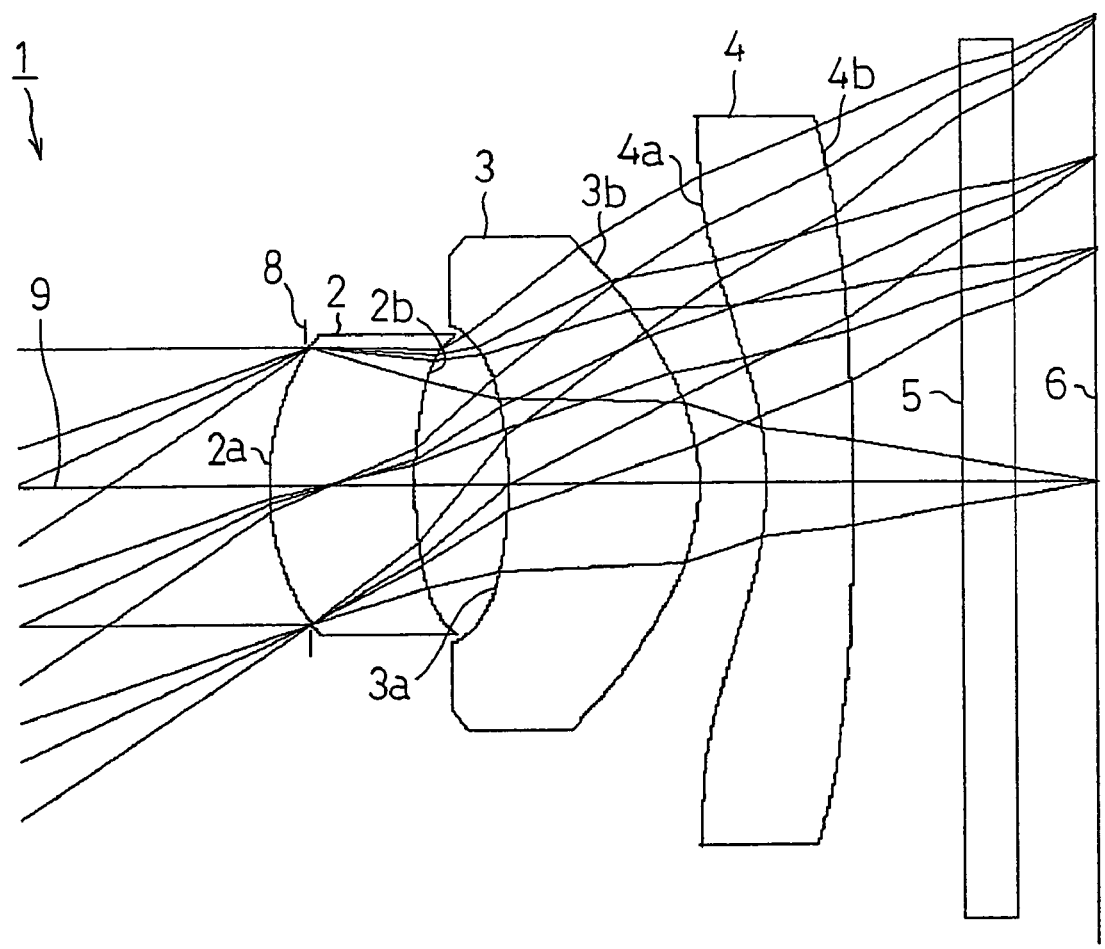
FIG. 11 is a schematic illustration showing FOURTH EXAMPLE of an imaging lens system according to the present invention.

FIG. 11 shows FOURTH EXAMPLE of the present invention. In FOURTH EXAMPLE, the diaphragm 8 was disposed on the first face 2a side of the first lens 2 in the same manner as the one shown in FIG. 1. In FOURTH EXAMPLE, the diaphragm 8 was also regarded as the same surface as the first face 2a of the first lens 2. Each lens was formed using plastics.

The imaging lens system 1 of FOURTH EXAMPLE was set under the following condition.

f=6.80 mm, F NO=2.80, ω=31.0°

| Face Number | r | d | nd | vd |
|---|---|---|---|---|
| (Object Point) | | ∞ | | |
| 1(First Face of First Lens)(Diaphragm) | 2.031 | 1.42 | 1.525 | 56 |
| 2(Second Face of First Lens) | 3.829 | 0.89 | | |
| 3(First Face of Second Lens) | −3.736 | 1.83 | 1.525 | 56 |
| 4(Second Face of Second Lens) | −1.740 | 0.66 | | |

-continued

| Face Number | r | d | nd | vd |
|---|---|---|---|---|
| 5(First Face of Third Lens) | −2.634 | 0.85 | 1.580 | 28 |
| 6(Second Face of Third Lens) | −51.341 | 1.00 | | |
| 7(First Face of Cover Glass) | 0.0 | 0.50 | 1.517 | 64 |
| 8(Second Face of Cover Glass) (Image Surface) | 0.0 | | | |

| Face No. | k | A | B | C | D |
|---|---|---|---|---|---|
| 1 | 0.1445 | −0.10703758e−02 | 0.20702341e−02 | 0.00000000e+00 | 0.00000000e+00 |
| 2 | 7.3424 | 0.28662505e−02 | −0.75946306e−03 | 0.00000000e+00 | 0.00000000e+00 |
| 3 | 6.0159 | −0.18887160e−01 | 0.00000000e+00 | 0.00000000e+00 | 0.00000000e+00 |
| 4 | −0.9697 | 0.63493477e−02 | 0.00000000e+00 | 0.00000000e+00 | 0.00000000e+00 |
| 5 | −1.5827 | 0.14996412e−01 | −0.54056138e−03 | 0.00000000e+00 | 0.00000000e+00 |
| 6 | 209.6667 | −0.36408856e−02 | 0.15600655e−03 | 0.00000000e+00 | 0.00000000e+00 |

Under such conditions, $v_1=56$, $v_2=56$, $v_3=28$ were achieved, thereby satisfying the conditions expressed by each of the expressions (1) to (3). Also, $r_1/f=0.30$ was achieved, thereby satisfying the condition expressed by the expression (4). Further, $r_2/r_1=1.89$, $d_1/f=0.21$ were achieved, thereby satisfying the conditions expressed by the expressions (5) and (6). Further, $r_3/f=-0.55$ was achieved, thereby satisfying the condition expressed by the expression (7).

Figure 12:
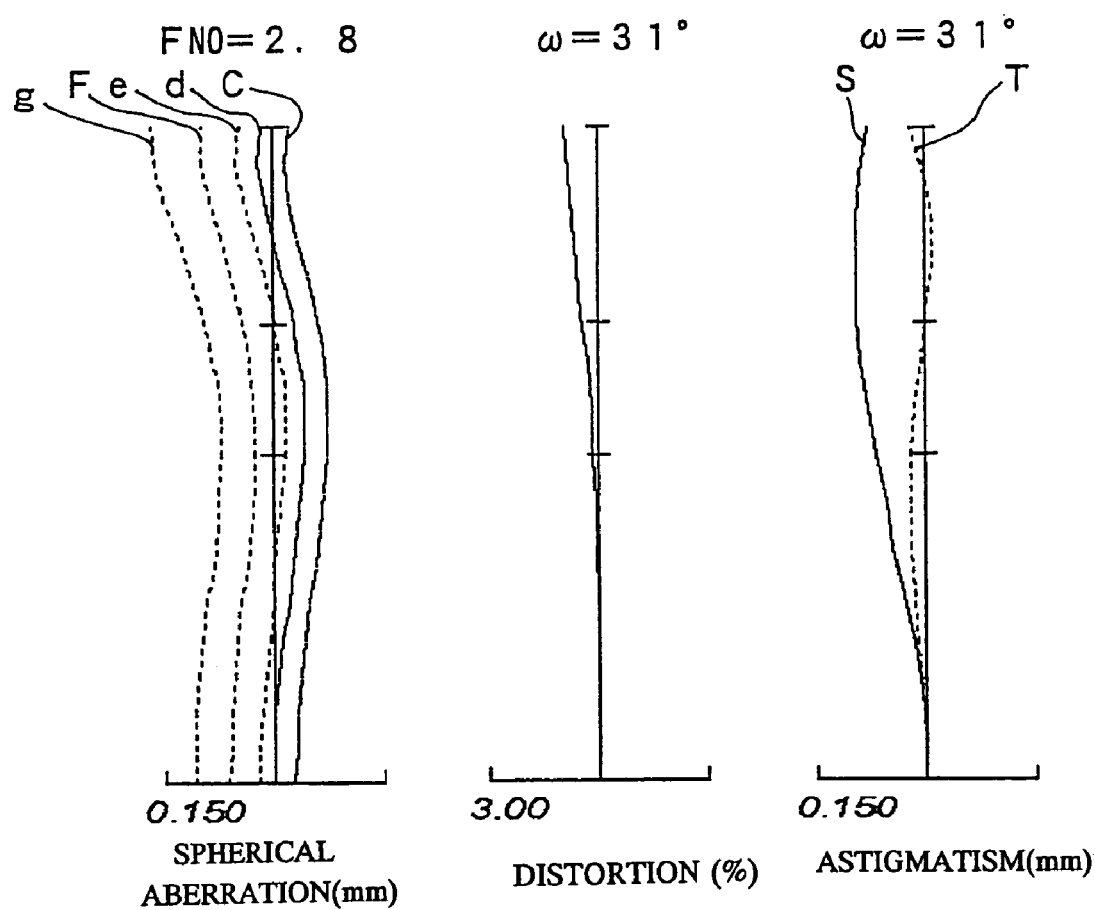
FIG. 12 is an explanatory illustration showing spherical aberration, distortion and astigmatism of the imaging lens system shown in FIG. 11.
Figure 13:
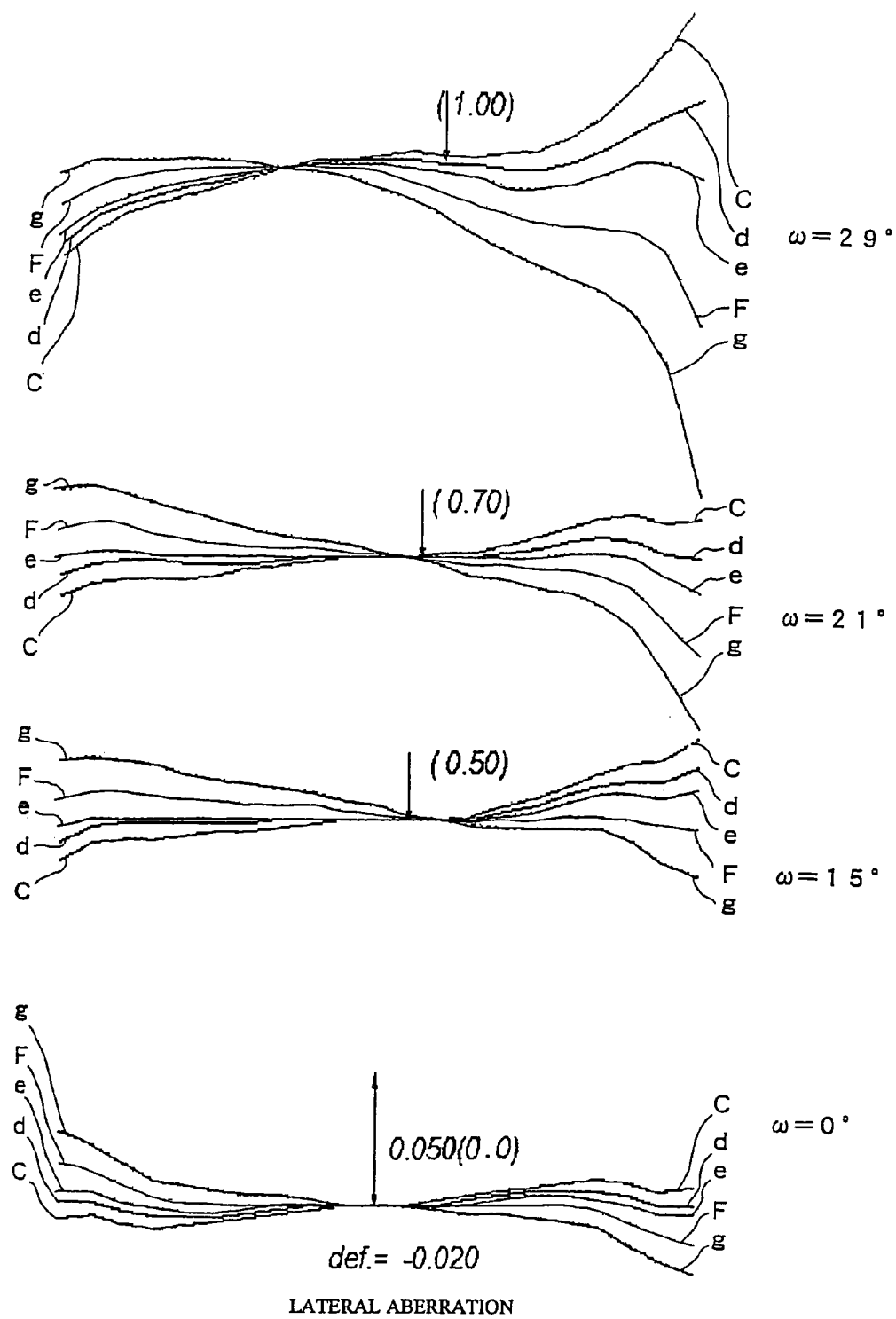
FIG. 13 is an explanatory illustration showing lateral aberration of the imaging lens system shown in FIG. 11.

FIG. 12 shows the spherical aberration, the distortion and the astigmatism of the imaging lens system 1 of FOURTH EXAMPLE and FIG. 13 shows the lateral aberration.

The spherical aberration, the distortion, the astigmatism and the lateral aberration were all satisfied. According to the results, it can be seen that a sufficient optical property can be obtained.

The whole length of the imaging lens system 1 at this time was 7.9499 mm, which sufficiently met the demands for reducing the size and weight.

Also, the angle of incident against the sensor surface of the image sensor element controlled below 28.9°.

Fifth Example

Figure 14:
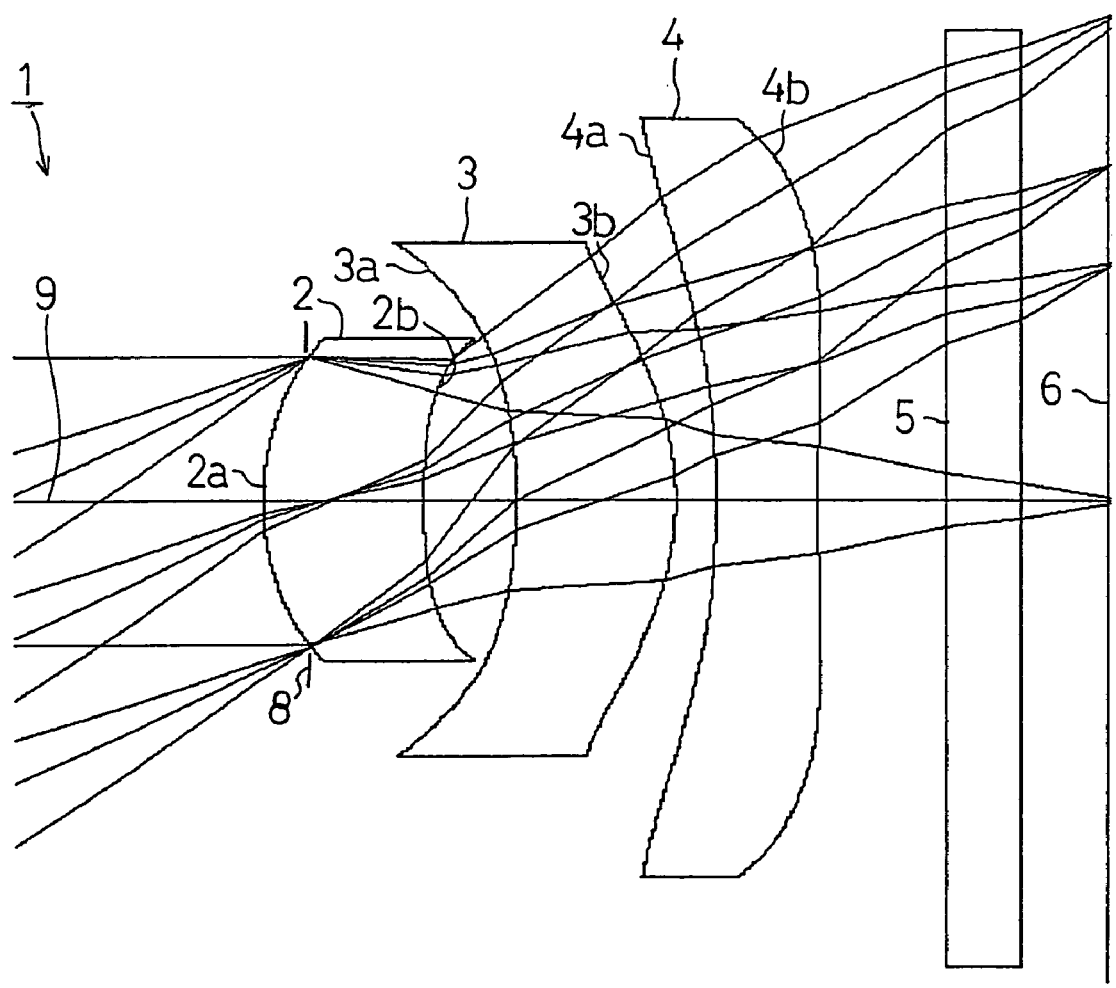
FIG. 14 is a schematic illustration showing FIFTH EXAMPLE of an imaging lens system according to the present invention.

FIG. 14 shows FIFTH EXAMPLE of the present invention. In FIFTH EXAMPLE, the diaphragm 8 was disposed on the first face 2a side of the first lens 2 in the same manner as the one shown in FIG. 1. In FIFTH EXAMPLE, the diaphragm 8 was also regarded as the same surface as the first face 2a of the first lens 2. Each lens was formed using plastics.

The imaging lens system 1 of FIFTH EXAMPLE was set under the following condition.
f=5.14 mm, F NO=2.80, ω=30.9°

| Face Number | r | d | nd | vd |
|---|---|---|---|---|
| (Object Point) | ∞ | | | |
| 1(First Face of First Lens)(Diaphragm) | 1.493 | 1.10 | 1.525 | 56 |
| 2(Second Face of First Lens) | 2.636 | 0.68 | | |
| 3(First Face of Second Lens) | −3.491 | 1.10 | 1.525 | 56 |
| 4(Second Face of Second Lens) | −1.721 | 0.29 | | |
| 5(First Face of Third Lens) | −4.311 | 0.70 | 1.585 | 30 |
| 6(Second Face of Third Lens) | 12.311 | 0.90 | | |
| 7(First Face of Cover Glass) | 0.0 | 0.50 | 1.517 | 64 |
| 8(Second Face of Cover Glass) (Image Surface) | 0.0 | | | |

| Face No. | k | A | B | C | D |
|---|---|---|---|---|---|
| 1 | −1.1590 | 0.45318641e−01 | 0.22694786e−01 | 0.00000000e+00 | 0.00000000e+00 |
| 2 | 4.7197 | 0.36224590e−01 | −0.52219612e−01 | 0.96692741e−01 | 0.00000000e+00 |
| 3 | 0.0000 | −0.67798632e−01 | 0.00000000e+00 | 0.00000000e+00 | 0.00000000e+00 |
| 4 | −0.9476 | −0.20856033e−02 | 0.92372441e−02 | 0.00000000e+00 | 0.00000000e+00 |
| 5 | 0.0000 | 0.14251256e−02 | 0.86153640e−03 | 0.00000000e+00 | 0.00000000e+00 |
| 6 | 0.0000 | −0.18960241e−01 | −0.27002193e−02 | 0.83701156e−03 | −0.90957841e−04 |

Under such conditions, $v_1$=56, $v_2$=56, $v_3$=30 were achieved, thereby satisfying the conditions expressed by each of the expressions (1) to (3). Also, $r_1/f$=0.29 was achieved, thereby satisfying the condition expressed by the expression (4). Further, $r_2/r_1$=1.77, $d_1/f$=0.21 were achieved, thereby satisfying the conditions expressed by the expressions (5) and (6). Further, $r_3/f$=−0.68 was achieved, thereby satisfying the condition expressed by the expression (7).

The spherical aberration, the distortion, the astigmatism and the lateral aberration were all satisfied. According to the results, it can be seen that a sufficient optical property can be obtained.

The whole length of the imaging lens system 1 at this time was 5.8682 mm, which sufficiently met the demands for reducing the size and weight.

Also, the angle of incident against the sensor surface of the image sensor element can be controlled below 27.8°.

Sixth Example

FIG. 17 shows SIXTH EXAMPLE of the present invention. In SIXTH EXAMPLE, the diaphragm 8 was disposed on the first face 2a side of the first lens 2 in the same manner as the one shown in FIG. 1. In SIXTH EXAMPLE, the diaphragm 8 was also regarded as the same surface as the first face 2a of the first lens 2. Each lens was formed using plastics.

The imaging lens system 1 of SIXTH EXAMPLE was set under the following condition.
f=5.14 mm, F NO=2.80, ω=30.9°

| Face Number | r | d | nd | vd |
|---|---|---|---|---|
| (Object Point) | ∞ | | | |
| 1(First Face of First Lens)(Diaphragm) | 2.500 | 1.10 | 1.525 | 56 |
| 2(Second Face of First Lens) | 7.371 | 1.03 | | |
| 3(First face of Second Lens) | −4.779 | 1.10 | 1.525 | 56 |
| 4(Second Face of Second Lens) | −1.367 | 0.55 | | |

-continued

| Face Number | r | d | nd | vd |
|---|---|---|---|---|
| 5(First Face of Third Lens) | −3.285 | 0.75 | 1.585 | 30 |
| 6(Second Face of Third Lens) | 5.027 | 0.90 | | |
| 7(First Face of Cover Glass) | 0.0 | 0.50 | 1.517 | 64 |
| 8(Second Face of Cover Glass) (Image Surface) | 0.0 | | | |

| Face No. | k | A | B | C | D |
|---|---|---|---|---|---|
| 1 | −7.6682 | 0.54282807e−01 | −0.10279807e−01 | 0.00000000e+00 | 0.00000000e+00 |
| 2 | −40.3114 | 0.24139365e−01 | −0.25715760e−02 | 0.68454623e−03 | 0.00000000e+00 |
| 3 | 0.0000 | −0.32973840e−01 | 0.00000000e+00 | 0.00000000e+00 | 0.00000000e+00 |
| 4 | −2.3532 | −0.43426290e−01 | 0.29322855e−02 | 0.00000000e+00 | 0.00000000e+00 |
| 5 | 0.0000 | 0.75834866e−02 | −0.39274000e−02 | 0.00000000e+00 | 0.00000000e+00 |
| 6 | 0.0000 | −0.33847935e−01 | 0.47347493e−02 | −0.76325368e−03 | 0.47310899e−04 |

Figure 15:
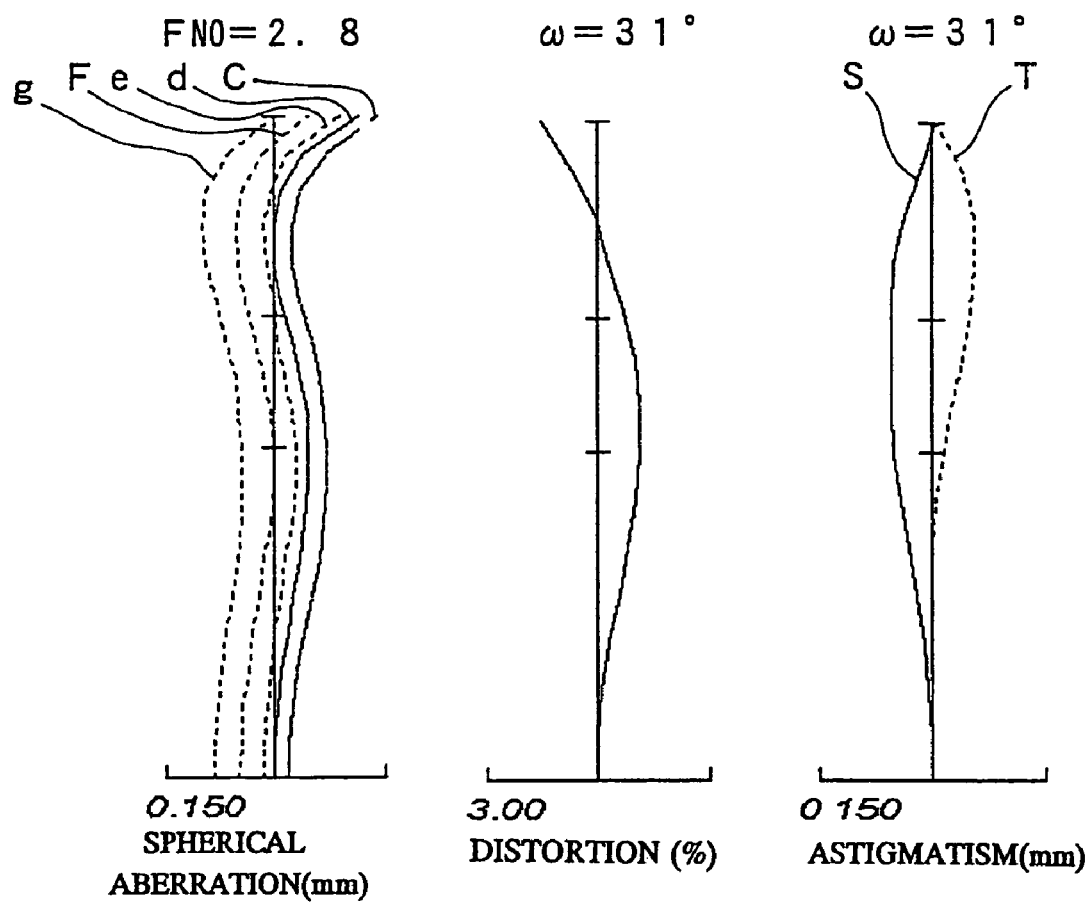
FIG. 15 is an explanatory illustration showing spherical aberration, distortion and astigmatism of the imaging lens system shown in FIG. 14.
Figure 16:
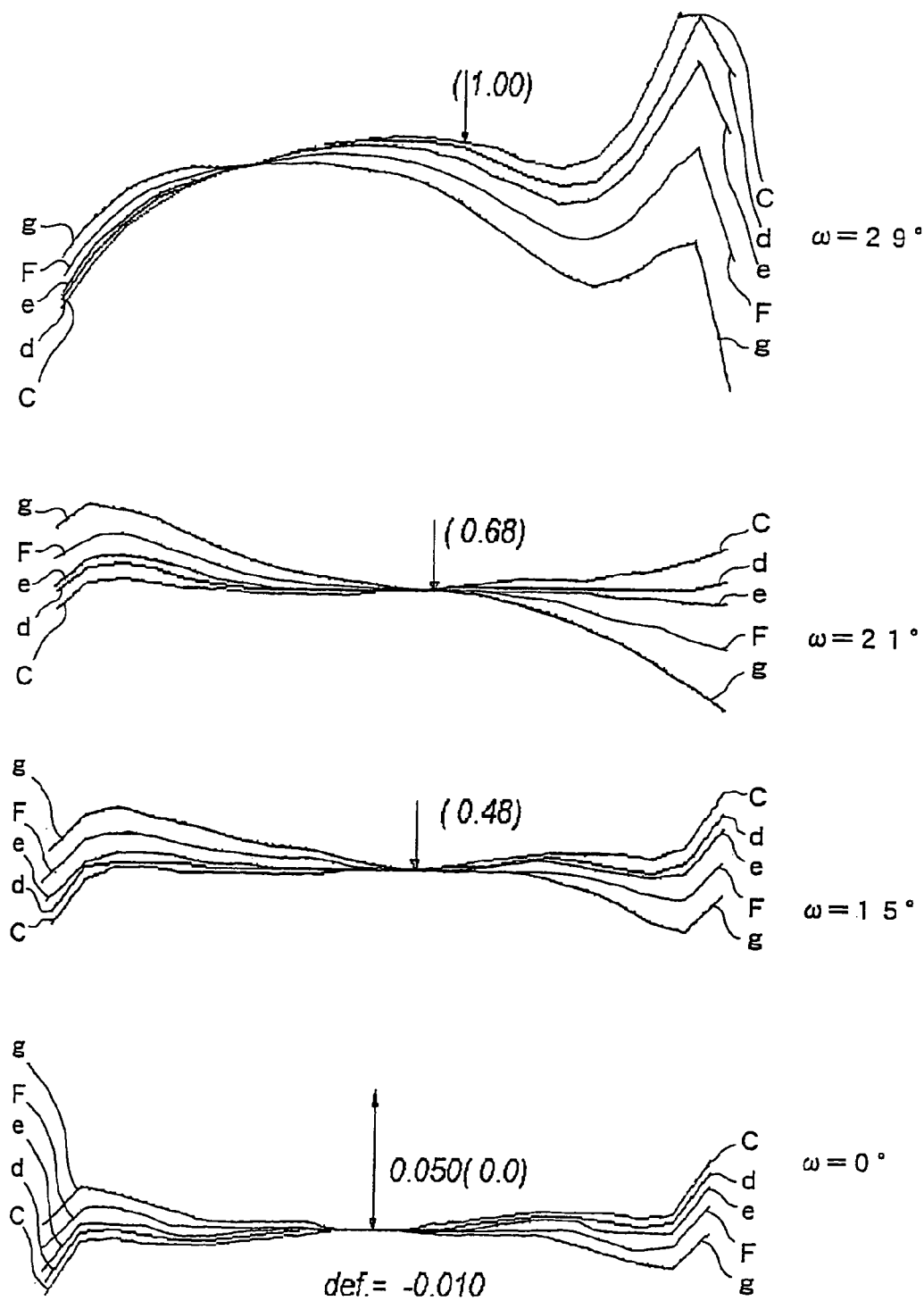
FIG. 16 is an explanatory illustration showing lateral aberration of the imaging lens system shown in FIG. 14.

FIG. 15 shows the spherical aberration, the distortion and the astigmatism of the imaging lens system 1 of FIFTH EXAMPLE and FIG. 16 shows the lateral aberration.

Under such conditions, $v_1$=56, $v_2$=56, $v_3$=30 were achieved, thereby satisfying the conditions expressed by each of the expressions (1) to (3). Also, $r_1/f$=0.49 was achieved, thereby satisfying the condition expressed by the expression (4). Further, $r_2/r_1=2.95$, $d_1/f=0.21$ were achieved, thereby satisfying the conditions expressed by the expressions (5) and (6). Further, $r_3/f=-0.93$ was achieved, thereby satisfying the condition expressed by the expression (7).

Figure 18:
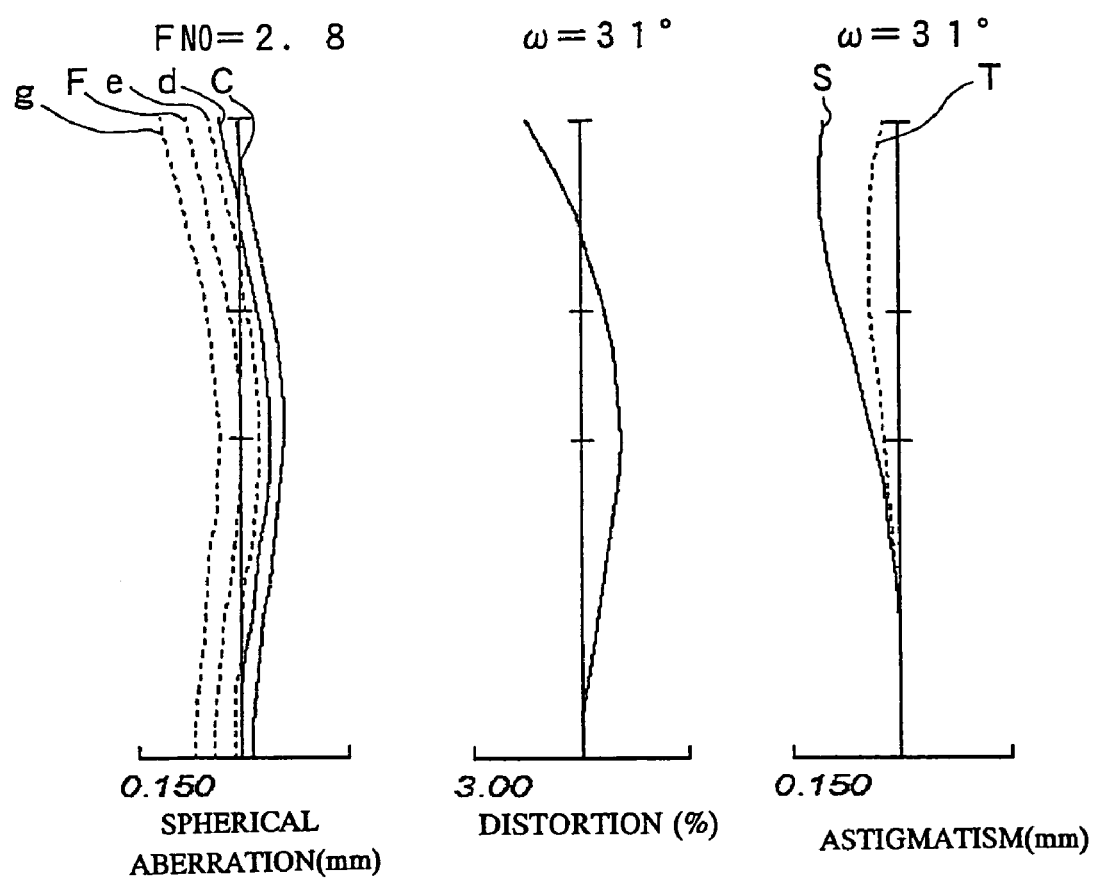
FIG. 18 is an explanatory illustration showing spherical aberration, distortion and astigmatism of the imaging lens system shown in FIG. 17.
Figure 19:
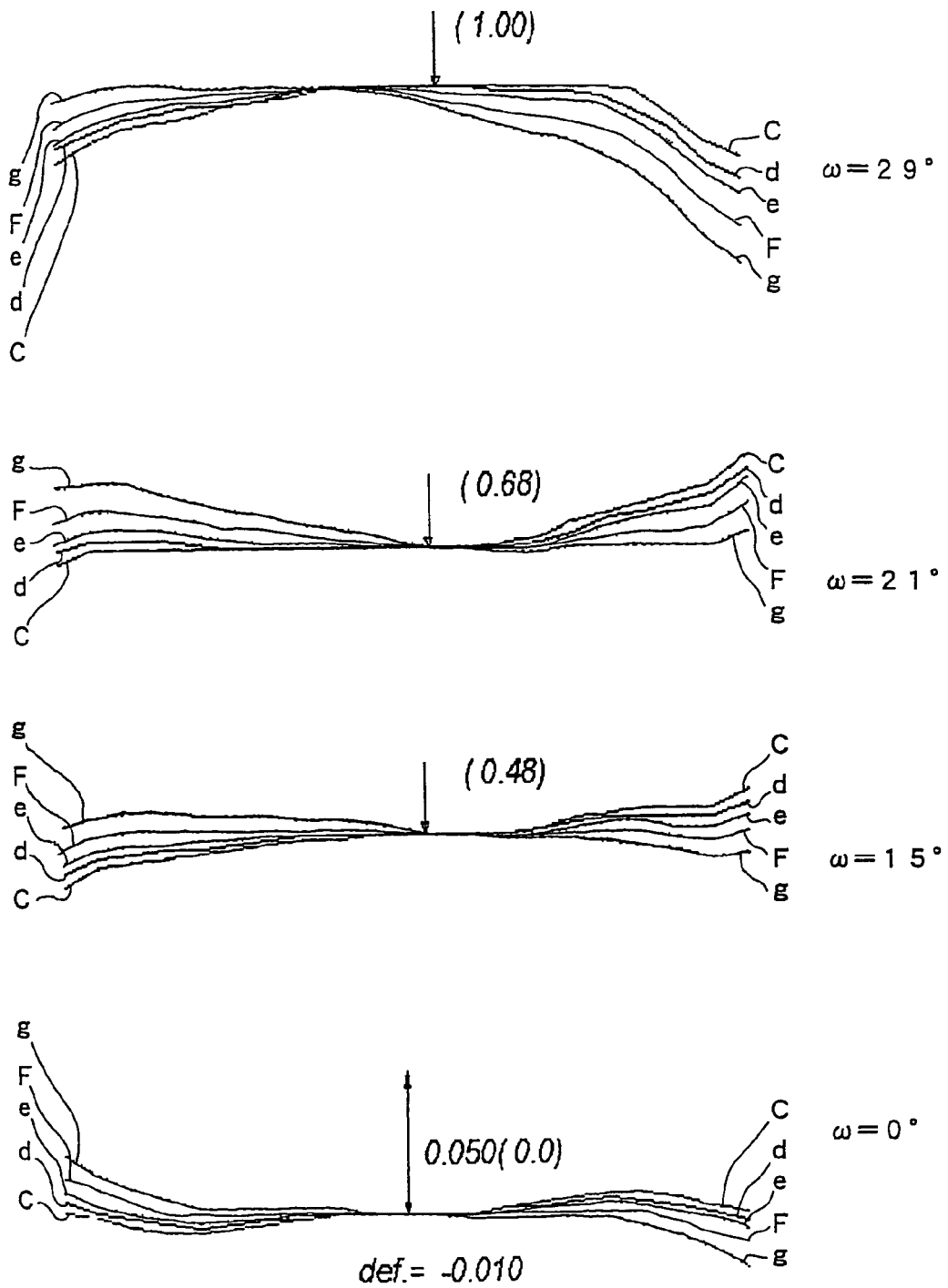
FIG. 19 is an explanatory illustration showing lateral aberration of the imaging lens system shown in FIG. 17.

FIG. 18 shows the spherical aberration, the distortion and the astigmatism of the imaging lens system 1 of SIXTH EXAMPLE and FIG. 19 shows the lateral aberration.

The spherical aberration, the distortion, the astigmatism and the lateral aberration were all satisfied. According to the results, it can be seen that a sufficient optical property can be obtained.

The whole length of the imaging lens system 1 at this time was 6.5238 mm, which sufficiently met the demands for reducing the size and weight.

Also, the angle of incident against the sensor surface of the image sensor element can be controlled below 28.2°.

Seventh Example

Figure 20:
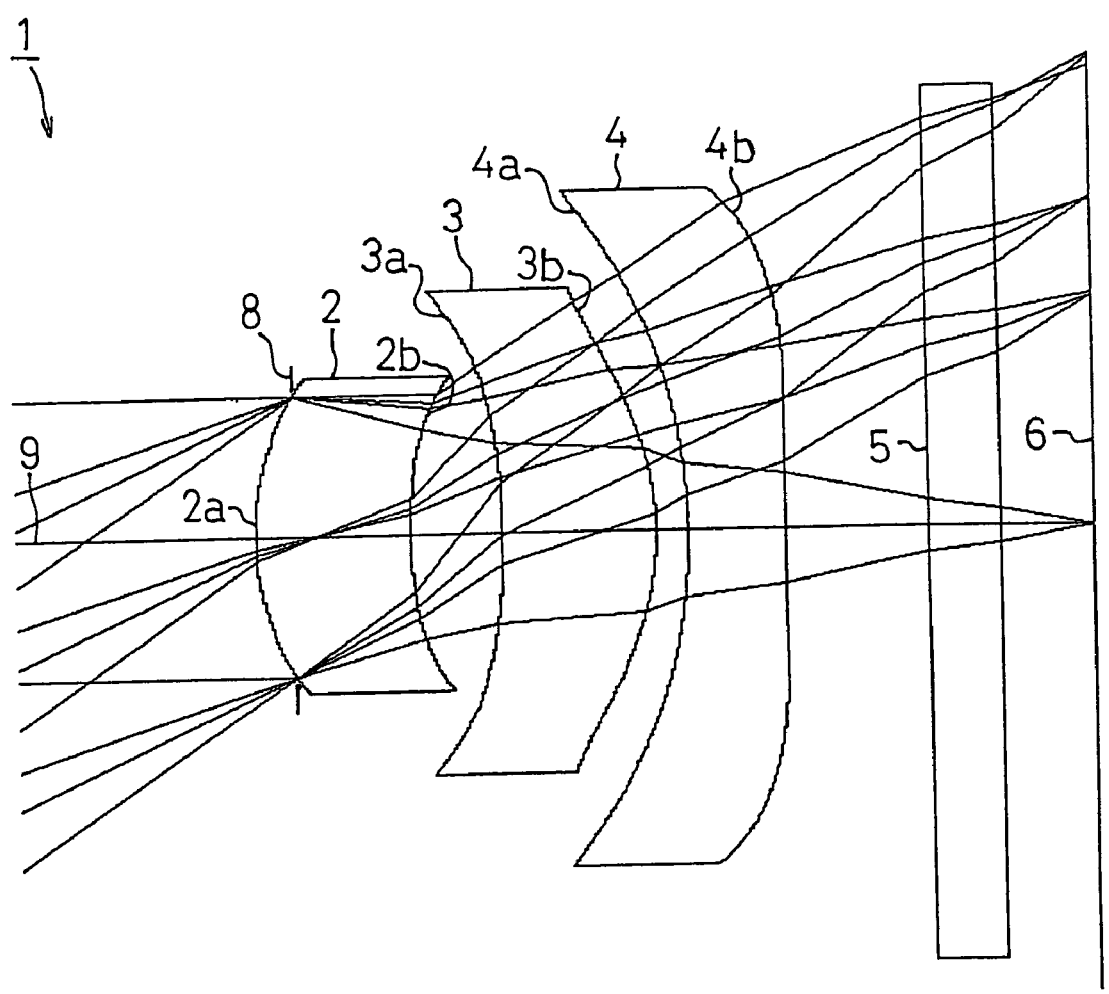
FIG. 20 is a schematic illustration showing SEVENTH EXAMPLE of an imaging lens system according to the present invention.

FIG. 20 shows SEVENTH EXAMPLE of the present invention. In SEVENTH EXAMPLE, the diaphragm 8 was disposed on the first face 2a side of the first lens 2 in the same manner as the one shown in FIG. 1. In SEVENTH EXAMPLE, the diaphragm 8 was also regarded as the same surface as the first face 2a of the first lens 2. The first lens 2 was formed using glass, and the second lens 3 and the third lens 4 were formed using plastics.

The imaging lens system 1 of SEVENTH EXAMPLE was set under the following condition.

f=5.14 mm, F NO=2.80, ω=30.9°

| Face Number | r | d | nd | vd |
|---|---|---|---|---|
| (Object Point) | ∞ | | | |
| 1(First Face of First Lens)(Diaphragm) | 1.648 | 1.10 | 1.589 | 61 |
| 2(Second Face of First Lens) | 2.609 | 0.67 | | |
| 3(First Face of Second Lens) | −4.722 | 1.10 | 1.525 | 56 |
| 4(Second Face of Second Lens) | −1.692 | 0.23 | | |
| 5(First Face of Third Lens) | −3.555 | 0.71 | 1.585 | 30 |
| 6(Second Face of Third Lens) | 17.433 | 1.00 | | |
| 7(First Face of Cover Glass) | 0.0 | 0.50 | 1.517 | 64 |
| 8(Second Face of Cover Glass) (Image Surface) | 0.0 | | | |

| FaceNo. | k | A | B | C | D |
|---|---|---|---|---|---|
| 1 | −2.5332 | 0.68829044e−01 | 0.90912474e−02 | 0.00000000e+00 | 0.00000000e+00 |
| 2 | 0.2134 | 0.49451715e−01 | −0.48980750e−02 | 0.44673608e−01 | 0.00000000e+00 |
| 3 | 0.0000 | −0.41458030e−01 | 0.00000000e+00 | 0.00000000e+00 | 0.00000000e+00 |
| 4 | −1.9999 | −0.13626111e−01 | 0.11434664e−01 | 0.00000000e+00 | 0.00000000e+00 |
| 5 | 0.0000 | −0.12213748e−01 | 0.14568518e−02 | 0.00000000e+00 | 0.00000000e+00 |
| 6 | 0.0000 | −0.22967717e−01 | −0.16858693e−02 | 0.53348708e−03 | −0.88036611e−04 |

Under such conditions, $v_1=61$, $v_2=56$, $v_3=30$ were achieved, thereby satisfying the conditions expressed by each of the expressions (1) to (3). Also, $r_1/f=0.32$ was achieved, thereby satisfying the condition expressed by the expression (4). Further, $r_2/r_1=1.58$, $d_1/f=0.21$ were achieved, thereby satisfying the conditions expressed by the expressions (5) and (6). Further, $r_3/f=-0.92$ was achieved, thereby satisfying the condition expressed by the expression (7).

Figure 21:
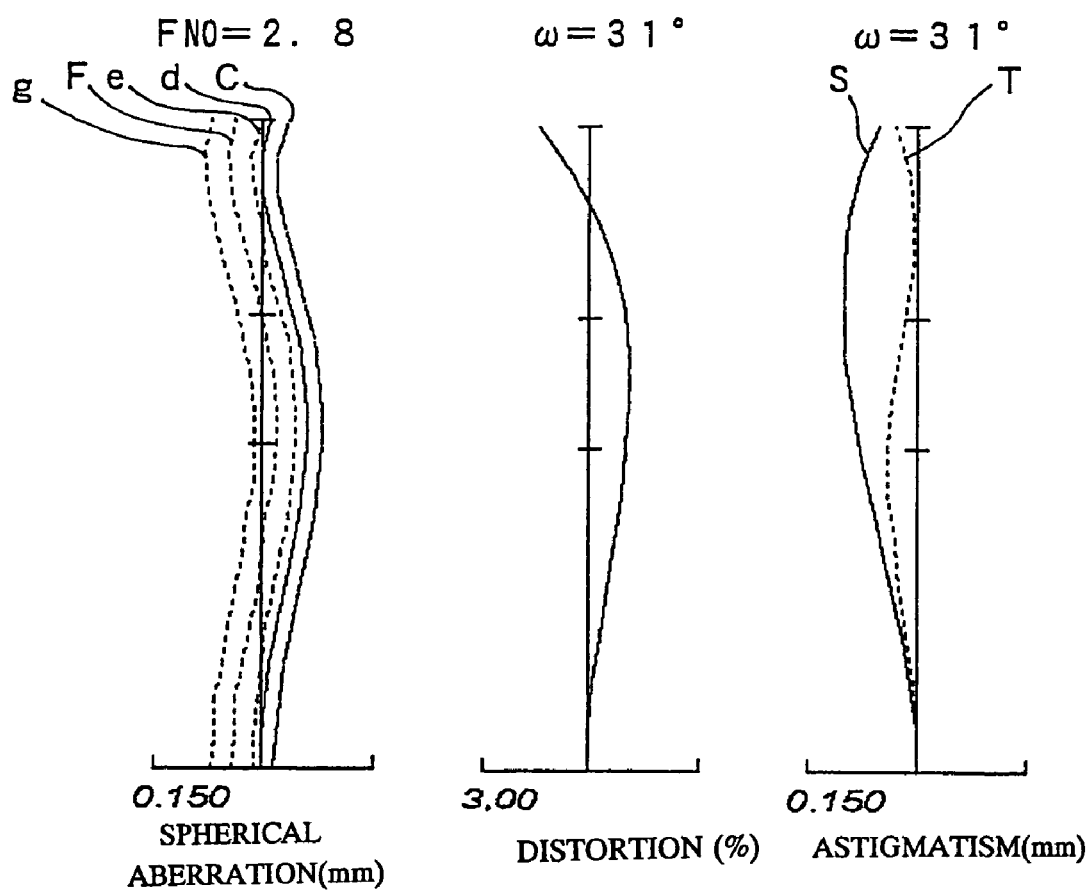
FIG. 21 is an explanatory illustration showing spherical aberration, distortion and astigmatism of the imaging lens system shown in FIG. 20.
Figure 22:
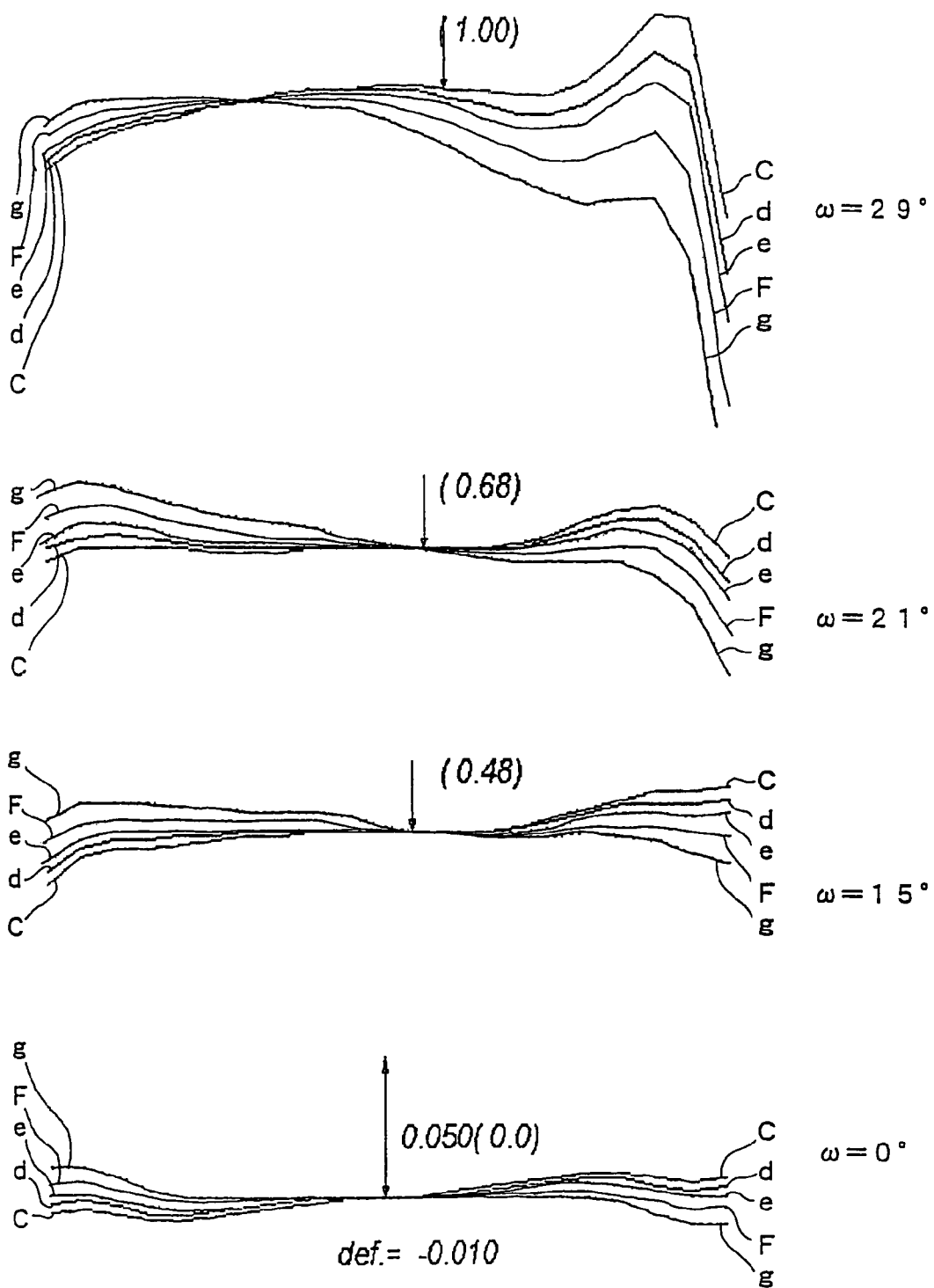
FIG. 22 is an explanatory illustration showing lateral aberration of the imaging lens system shown in FIG. 20.

FIG. 21 shows the spherical aberration, the distortion and the astigmatism of the imaging lens system 1 of SEVENTH EXAMPLE and FIG. 22 shows the lateral aberration.

The spherical aberration, the distortion, the astigmatism and the lateral aberration were all satisfied. According to the results, it can be seen that a sufficient optical property can be obtained.

The present invention is not limited to the above-described embodiment but various modifications can be applied as necessary.

For example, the optical materials forming each lens 2, 3, 4 may be glass or a resin material (for example, plastics).

What is claimed is:

1. An imaging lens system, consisting of: a first lens in a meniscus shape having a positive power convex surface facing an object side; a second lens in a meniscus shape having a positive power whose concave surface facing the object side; and a third lens having a negative power whose concave surface facing the object side; said three lenses are being disposed in order from the object side to the image surface side.

2. The imaging lens system according to claim 1, wherein a diaphragm is disposed on the object side of said first lens.

3. The imaging lens system according to claim 1 or claim 2, wherein, further, conditions expressed by each of following expressions (1) to (3) are to be satisfied;

$$40<v_1<70 \tag{1}$$

$$40<v_2<70 \tag{2}$$

$$20<v_3<40 \tag{3}$$

where, $v_1$: Abbe number of said first lens;
$v_2$: Abbe number of said second lens; and
$v_3$: Abbe number of said third lens.

4. The imaging lens system according to claim 3, wherein, further, a condition expressed by a following expression (4) is to be satisfied;

$$0.25<r_1/f<0.55 \tag{4}$$

where, $r_1$: radius of center curvature of a surface (first face) of said first lens on the object side; and
f: focal length of entire lens system.

5. The imaging lens system according to claim 1 or claim 2, wherein the surface of said third lens on the image surface side is formed in a shape which curves towards the object side from the core side to the periphery side.

6. The imaging lens system according to claim 1 or claim 2, wherein, said third lens is formed to have a smaller negative power on the periphery side than the negative power on the core side.

7. The imaging lens system according to claim 1 or claim 2, wherein, in each of said first lens, said second lens and said third lens, at least either one of the surfaces on the object side or the image surface side is formed in an aspherical shape.

8. The imaging lens system according to claim 1 or claim 2, wherein, further, a condition expressed by a following expression (4) is to be satisfied;

$$0.25 < r_1/f < 0.55 \tag{4}$$

where, $r_1$: radius of center curvature of a surface (first face) of said first lens on the object side; and f: focal length of entire lens system.

9. The imaging lens system according to claim 1 or claim 2, wherein, further, conditions expressed by following expressions (5) and (6) are to be satisfied;

$$1.5 < r_2/r_1 < 3.0 \tag{5}$$

$$0.15 < d_1/f < 0.35 \tag{6}$$

where, $r_2$: radius of center curvature of a surface (second face) of said first lens on the image surface side;

$d_1$: thickness in the center of said first lens;

$r_1$: radius of center curvature of a surface (first face) of said first lens on the object side; and f: focal length of entire lens system.

10. The imaging lens system according to claim 1 or claim 2, wherein, further, a condition expressed by a following expression (7) is to be satisfied;

$$-1.5 < r_3/f < -0.3 \tag{7}$$

where, $r_3$: radius of center curvature of a surface (first face) of said second lens on the object side; and f: focal length of entire lens system.

* * * * *